US009495260B2

(12) United States Patent
Knight

(10) Patent No.: US 9,495,260 B2
(45) Date of Patent: Nov. 15, 2016

(54) FAULT TOLERANT COMMUNICATIONS

(71) Applicant: SAS Institute Inc., Cary, NC (US)

(72) Inventor: Richard Knight, Raleigh, NC (US)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 14/747,965

(22) Filed: Jun. 23, 2015

(65) Prior Publication Data
US 2016/0004609 A1 Jan. 7, 2016

Related U.S. Application Data

(63) Continuation of application No. 14/747,763, filed on Jun. 23, 2015.
(Continued)

(51) Int. Cl.
G06F 11/00 (2006.01)
G06F 11/20 (2006.01)

(52) U.S. Cl.
CPC ......... *G06F 11/203* (2013.01); *G06F 11/2023* (2013.01); *G06F 11/2025* (2013.01); *G06F 11/2028* (2013.01); *G06F 11/2033* (2013.01); *G06F 11/2097* (2013.01); *G06F 11/2035* (2013.01); *G06F 11/2038* (2013.01);
(Continued)

(58) Field of Classification Search
CPC ............... G06F 11/203; G06F 11/2033; G06F 11/2025; G06F 11/2023
See application file for complete search history.

(56) References Cited

U.S. PATENT DOCUMENTS 5,271,013 A 12/1993 Gleeson
5,295,258 A 3/1994 Jewett et al.
(Continued)

FOREIGN PATENT DOCUMENTS

EP 1365538 A1 11/2003
WO WO 03013675 A1 2/2003

OTHER PUBLICATIONS

International Search Report and Written Opinion of the International Searching Authority for PCT Application No. PCT/US2015/037192, mailed Nov. 24, 2015, 16 pages.
(Continued)

Primary Examiner — Yolanda L Wilson
(74) Attorney, Agent, or Firm — Kilpatrick Townsend & Stockton LLP

(57) ABSTRACT

Apparatuses, systems and methods are disclosed for tolerating fault in a communications grid. Specifically, various techniques and systems are provided for detecting a fault or failure by a node in a network of computer nodes in a communications grid, adjusting the grid to avoid grid failure, and taking action based on the failure. In an example, a system may include receiving grid status information at a backup control node, the grid status information including a project status, storing the grid status information within the backup control node, receiving a failure communication including an indication that a primary control node has failed, designating the backup control node as a new primary control node, receiving updated grid status information based on the indication that the primary control node has failed, and transmitting a set of instructions based on the updated grid status information.

21 Claims, 23 Drawing Sheets

Related U.S. Application Data

(60) Provisional application No. 62/019,426, filed on Jul. 1, 2014.

(52) U.S. Cl.
CPC ....... *G06F 11/2041* (2013.01); *G06F 2201/84* (2013.01); *G06F 2201/85* (2013.01)

(56) References Cited

U.S. PATENT DOCUMENTS

| | | | |
|---|---|---|---|
| 5,488,716 A | 1/1996 | Schneider et al. | |
| 5,621,885 A | 4/1997 | Del Vigna | |
| 5,796,934 A | 8/1998 | Bhanot et al. | |
| 5,968,185 A | 10/1999 | Bressoud et al. | |
| 6,393,583 B1 | 5/2002 | Meth et al. | |
| 6,438,707 B1 | 8/2002 | Ronstrom | |
| 6,622,262 B1 | 9/2003 | Nagoya | |
| 6,993,764 B2 | 1/2006 | Petrini et al. | |
| 7,149,858 B1 | 12/2006 | Kiselev | |
| 7,185,236 B1 | 2/2007 | Moser et al. | |
| 7,305,585 B2 | 12/2007 | Marchand | |
| 7,373,545 B2 | 5/2008 | Leveille et al. | |
| 7,475,274 B2 | 1/2009 | Davidson | |
| 7,484,032 B2 | 1/2009 | Smith | |
| 7,571,347 B2 | 8/2009 | Gross et al. | |
| 7,610,509 B2 | 10/2009 | Abe | |
| 7,610,510 B2 | 10/2009 | Agarwal et al. | |
| 7,657,787 B2 | 2/2010 | Turner et al. | |
| 7,779,298 B2 | 8/2010 | Challenger et al. | |
| 7,870,439 B2 | 1/2011 | Fujiyama et al. | |
| 7,941,404 B2 | 5/2011 | Garimella et al. | |
| 8,041,798 B1 | 10/2011 | Pabla et al. | |
| 8,250,405 B2 | 8/2012 | Elnozahy | |
| 8,271,537 B2* | 9/2012 | Schabenberger | G06F 17/30575 707/802 |
| 8,291,419 B2 | 10/2012 | Aridor et al. | |
| 8,335,813 B2 | 12/2012 | Sun et al. | |
| 8,381,028 B2 | 2/2013 | Elnozahy | |
| 8,473,783 B2 | 6/2013 | Andrade et al. | |
| 2005/0081097 A1* | 4/2005 | Bacher | G06F 11/2023 714/13 |
| 2006/0253726 A1 | 11/2006 | Kukshya et al. | |
| 2007/0013948 A1 | 1/2007 | Bevan | |
| 2007/0214196 A1* | 9/2007 | Garimella | G06F 11/1464 |
| 2008/0243866 A1 | 10/2008 | Pandey | |
| 2009/0019258 A1 | 1/2009 | Shi | |
| 2011/0029675 A1 | 2/2011 | Yeow et al. | |
| 2011/0178983 A1 | 7/2011 | Bernhard et al. | |
| 2011/0228668 A1* | 9/2011 | Pillai | G06F 11/2023 370/217 |
| 2012/0124100 A1 | 5/2012 | Schabenberger et al. | |
| 2012/0131139 A1* | 5/2012 | Siripurapu | H04L 65/60 709/217 |
| 2012/0233496 A1 | 9/2012 | Gil et al. | |

OTHER PUBLICATIONS

First Action Interview Pilot Program Pre-Interview Communication of Jan. 14, 2016 for U.S. Appl. No. 14/747,763, 4 pages.
Thara Angskun et al., "Binomial Graph: A Scalable and Fault-Tolerant Logical Network Topology" 12 pages, retrieved May 28, 2015 from icl.cs.utk.edu/binomial-graph-ISPA-07.pdf.
Thara Angskun et al., "Scalable Fault Tolerant Protocol for Parallel Runtime Environments" 9 pages, retrieved on Jun. 2, 2015 from http//icl.cs.utk.edu/news_pub/submissions/.pdf.
Anne Benoit et al., "Efficient checkpoint/verification patterns for silent error detection" 16 pages, May 2014, retrieved on Jun. 2, 2015 from http://www.netlib.org/lapack/lawnspdf/lawn287.pdf.
Wesley Bland et al., "An Evaluation of User-Level Failure Mitigation Support in MPI" 13 pages, retrieved Jun. 2, 2015 from http://icl.cs.utk.edu/news_pub/submissions/MPIULFM-ComputingJournalDraft.pdf.
Wesley Bland et al., "Extending the Scope of the Checkpoint-on-Failure Protocol for Forward Recovery in Standard MPI" 17 pages, retrieved on Jun. 2, 2015 from http://www.netlib.org/utk/people/JackDongarra/PAPERS/ccpe_cof-submission.pdf.
Wesley Bland et al., "A Proposal for User-Level Failure Mitigation in the MPI-3 Standard" 9 pages, retrieved Jun. 2, 2015 from http://icl.cs.utk.edu/news_pub/submissions/mpi3ft.pdf.
Wesley Bland et al., "User Level Failure Mitigation in MPI" 5 pages, retrieved Jun. 2, 2015 from http://icl.cs.utk.edu/news_pub/submissions/resilience-ulfm.pdf.
George Bosilca et al., "Dodging the Cost of Unavoidable Memory Copies in Message Logging Protocols" 9 pages retrieved May 28, 2015 from icl.cs.utk.edu/news_pub/submissions/hpc-ml.pdf
George Bosilca et al., "On Scalability for MPI Runtime Systems" 9 pages, Cluster Computing (CLUSTER), 2011 IEEE International Conference.
George Bosilea et al., "Scalable Runtime for MPI: Efficiently Building the Communication Infrastructure" EuroMPI 2011, LNCS 6960, pp. 342-344, 2011 Springer-Verlag Berlin Heidelberg 2011.
Aurelien Bouteiller et al., "Correlated Set Coordination in Fault Tolerant Message Logging Protocols" Euro-Par 2011, LNCS 6853, Part II, pp. 51-64, 2011. Springer-Verlag Berlin Heidelberg 2011.
Zizhong Chen and Jack J. Dongarra "Condition Numbers of Gaussian Random Matrices" 19 pages, retrieved May 28, 2015 citeseerx.ist.psu.edu/viewdoc/download?doi=10.1.1.67.2210.
Zizhong Chen et al., "Fault Tolerant High Performance Computing by a Coding Approach" 11 pages, PPoPP'05, Jun. 15-17, 2005, Chicago, Illinois, USA 2005 ACM 1595930809.
Zizhong Chen et al., "Numerically Stable Real Number Codes Based on Random Matrices" 8 pages, http://icl.cs.utk.edu/news_pub/submissions/Real_Number_Codes.pdf.
David Cronk et al., "Parallel I/O for EQM Applications" 21 pages, retrieved on Jun. 2, 2015 from citeseerx.ist.psu.edu/viewdoc/summary?doi=10.1.1.135.4810.
John DelSignore et al., "The MPI Message Queue Dumping Interface Version 1.0 MPI Forum Working Group on Tools Accepted by the Message Passing Interface Forum" 32 pages, Dec. 12, 2013 retrieved Jun. 2, 2015 from http://www.mpi-forum.org/docs/msgg.5.pdf.
David Dewolfs et al., "FT-MPI, Fault-Tolerant Metacomputing and Generic Name Services : a Case Study" 8 pages, retrieved on Jun. 2, 2015 from http://icl.cs.utk.edu/projectsfiles/ftmpi/pubs/paper_v2.camera_ready.pdf.
Jack J. Dongarra et al, "Chapter in Wiley Encyclopedia of Electrical and Electronics Engineering" 33 pages, Oct. 13, 1999 retrieved Jun. 2, 2015 from www.netlib.org/utk/people/JackDongarra/PAPERS/mpss-ency.ps.
Peng Du et al., "Algorithm-based Fault Tolerance for Dense Matrix Factorizations" 10 pages, retrieved Jun. 2, 2015 from ftp://ftp.eecs.utk.edu/pub/TechReports/2011/ut-cs-11-676.pdf.
Christian Engelmann and Swen Bohm":Redundant Execution of HPC Applications With MR-MPI" 8 pages, retrieved on May 28, 2015 from http://www.csm.ornl.gov/~engelman/publications/engelmann11redundant.
Graham E. Fagg and Jack J. Dongarra, "FT-MPI: Fault Tolerant MPI, supporting dynamic applications in a dynamic world", 8 pages, retrieved on May 28, 2015 from ftp://ftp.idsa.prd.fr/pub/netllb/utk/people/JackDongarra/PAPERS/ft-mpi.pdf.
Graham E. Fagg et al., "Parallel IO support for Meta-Computing Applications: MPI_Connect IO applied to PACX-MPI" 14 pages retrieved May 28, 2015 from www.netllb.org/utk/people/JackDongarra/PAPERS/epvm2001-pio.pdf.
Graham E. Fagg and Jack J. Dongarra "Building and using an Fault Tolerant MPI implementation" 10 pages, retrieved on May 28, 2015 from http://www.netlib.org/utk/people/JackDongarra/PAPERS/ft-mpi-lyon-fagg.pdf.
Graham E. Fagg et al., "Flexible collective communication tuning architecture applied to Open MPI" 10 pages retrieved May 28, 2015 from icl.cs.utk.edu/_../Flex-collective-euro-pymmpi-20.
Graham E. Fagg et al., "Extending the MPI Specification for Process Fault Tolerance on High Performance Computing Systems" 33 pages, citeseerx.ist.psu.edu/viewdoc/summary?doi=10.1.1.214.930.

(56) References Cited

OTHER PUBLICATIONS

Graham E. Fagg et al., "Fault Tolerant Communication Library and Applications for High Performance Computing" 10 pages, retrieved Jun. 2, 2015 from http://icl.cs.utk.edu/news_pub/submissions/lacsi2003-ftmpi-fagg.pdf.
Graham E. Fagg et al., "Process Fault-Tolerance: Semantics, Design and Applications for High Performance Computing" 10 pages, retrieved Jun. 2, 2015 from http://icl.cs.utk.edu/projectsfiles/lacsi/pubs/lacsi2003-ijhpca04.pdf.
Graham E. Fagg et al., "Scalable Fault Tolerant MPI: Extending the recovery algorithm" 9 pages, retrieved on Jun. 2, 2015 from http://icl.cs.utk.edu/news_pub/submissions/pdf.
Kurt B. Ferreira et al., "Transparent Redundant Computing with MPI" 23 pages, retrieved on May 28, 2015 from https://fs.hlrs.de/projects/erompi2010/TALKS/TUESDAY_MORNING_TRACK2/Kurt_Ferreira_presentation.pdf.
Edgar Gabriel, "Fault Tolerant MPI" 70 pages, retrieved on May 28, 2015 from http://www.dsi.unive.it/pvmmpi03/post/epvm03tutb2.pdf.
Edgar Gabriel et al., "A Fault-Tolerant Communication Library for Grid Environments" 10 pages, retrieved May 28, 2015 from citeseerx.ist.psu.edu/viewdoc/download?doi=10.1.1.8.4150.
Edgar Gabriel et al., "Evaluating the performance of MPI-2 dynamic communicators and one-sided communication" 10 pages, retrieved May 28, 2015 from www.netlib.org/utk/people/JackDongarra/.../europvm-mpi-2003-mpi2.p.
William Gropp and Ewing Lusk, "Fault Tolerance in MPI Programs" 15 pages, retrieved on May 28, 2015 from http://www.mcs.anl.gov/~lusk/papers/fault-tolerance.pdf.
Harness Fault Tolerant MPI, 4 pages, retrieved on Aug. 21, 2014 from http://icl.cs.utk.edu/ftmpi/overview/index.html.
David Lisuk et al., "Map Fold: A Pipelined Distributed Data Processing Framework" 8 pages, retrieved May 28, 2015 from www.davidlisuk.com/files/spring_2014_mapfold.pdf.
MPI Forum "Ft Discussions—MPI Forum" 2 pages, retrieved Aug. 21, 2014 from https://svn.mpi-forum.org/trac/mpi-forum-web/wiki/FtDiscussions.
MPI Forum, "FT Distributed Server—MPI Forum" 2 pages, retrieved on Aug. 21, 2014 from https://svn.mpi-forum.org/trac/mpi-forum-web/wiki/FTDistributedServer.
MPI: A Message-Passing Interface Standard Version 3.0 Message Passing Interface Forum, 36 pages, Sep. 21, 2012 retrieved on Jun. 2, 2015 from http://www.mpi-forum.org/docs/mpi-3.0/mpi30-report.pdf.
Open MPI: Open Source High Performance Computing 1 page, retrieved on May 28, 2015 from http://www.open-mpl.org.

Jelena Pjesivac-Grbovic et al., "Performance Analysis of MPI Collective Operations" 25 pages, retrieved Jun. 2, 2015 from http://icl.cs.utk.edu/projectsfiles/ftmpl/pubs/jpg_mpi_perf_analysis_cluster.pdf.
Jelena Pjesivac-Grbovic et al., "Performance Analysis of MPI Collective Operations" 18 pages, retrieved Jun. 2, 2015 from http://icl.cs.utk.edu/projectsfiles/ftmpi/pubs/jpg_mpi_perf_analysis_cluster.pdf.
Jelena Pjesivac-Grbovic et al., "MPI Collective Algorithm Selection and Quadtree Encoding" 16 pages, retrieved Jun. 2, 2015 from http://icl.cs.utk.edu/projectsfiles/ftmpi/pubs/qt_decision.pdf.
Jelena Pjesivac-Grbovic et al., "MPI Collective Algorithm Selection and Quadtree Encoding" 8 pages, retrieved Jun. 2, 2015 from http://icl.cs.utk.edu/projectsfiles/ftmpi/pubs/qt_decision.pdf.
Jelena Pjesivac-Grbovic et al., "MPI Collective Algorithm Selection and Quadtree Encoding" 9 pages, retrieved Jun. 2, 2015 from http://icl.cs.utk.edu/projectsfiles/ftmpi/pubs/qt_decision.pdf.
Jelena Pjesivac-Grbovic et al., "Decision Trees and MPI Collective Algorithm Selection Problem" 11 pages, retrieved on Jun. 2, 2015 from http://icl.cs.utk.edu/projectsfiles/ftmpi/pubs/pjesivac-grbovic_europar_c4.5.pdf.
Sathish S. Vadhiyar et al., "Automatically Tuned Collective Communications" 11 pages, retrieved May 28, 2015 from ftp://ftp.irisa.fr/pub/mirrors/netlib/utk/people/JackDongarra/.../atcc.pdf.
Sathish S. Vadhiyar et al., "Performance Modeling for Self Adapting Collective Communications for MPI" 15 pages, retrieved May 28, 2015 from icl.cs.utk.edu/news_pub/.../coll-lacsi-2001.pdf.
Spark Apache Research, 2 pages, retrieved Jun. 29, 2015 from https://spark.apache.org/research.html.
Matei Zaharia et al., "Resilient Distributed Datasets: A Fault-Tolerant Abstraction for In-Memory Cluster Computing" 14 pages, retrieved Jun. 29, 2015 from https://www.cs.berkeley.edu/~matei/pepers/2012/nsdi_spark.pdf.
Matei Zaharia et al., "Spark: Cluster Computing with Working Sets", 7 pages, retrieved Jun. 29, 2015 from http://www.cs.berkeley.edu/~matei/papers/2010/hotcloud_spark.pdf.
Databricks, "Improved Fault-tolerance and Zero Data Loss in Spark Streaming" 7 pages, retrieved Jun. 29, 2015 from https://databricks.com/blog/2015/01/15/improved-driver-fault-tolerance-and-zero-data-loss-in-spark-streaming.html.
$H_2O$ Documentation 3.0, 233 pages, retrieved Jul. 17, 2015 from http://h2o-release.s3.amazonaws.com/h2o/rel-shannon/26/docs-website/h2o-docs/index.html.
$H_2O$.ai Datasheet "Fast, Scalable Machine & Deep Learning for Smarter Applications" 2 pages, retrieved Jul. 17, 2015 from http://0xdata.com/assets/sales/Datasheet-2015.pdf.
International Preliminary Report on Patentability for PCT Application No. PCT/US2015/037192, mailed Jun. 16, 2016, 6 pages.
Notice of Allowance of Jun. 21, 2016 for U.S. Appl. No. 14/747,763, 8 pages.

\* cited by examiner

FAULT TOLERANT COMMUNICATIONS

CROSS-REFERENCE TO RELATED APPLICATIONS

This is a continuation of and claims the benefit and priority of U.S. Nonprovisional application Ser. No. 14/747,763, filed Jun. 23, 2015, titled "SYSTEMS AND METHODS FOR FAULT TOLERANT COMMUNICATIONS," which claims the benefit and priority under 35 U.S.C. §119(e) of U.S. Provisional App. No. 62/019,426, filed Jul. 1, 2014, titled "Fault-Tolerant Communication Strategies for Distributed Processing." These applications are incorporated by reference herein for all purposes.

FIELD

The present disclosure relates to a computer technology for tolerating fault in a communications grid. Specifically, various techniques and systems are provided for detecting a fault or failure by a node in a network of computer nodes in a communications grid, adjusting the grid to avoid grid failure, and taking action based on the failure.

BACKGROUND

In a communications grid that includes a network of computer nodes executing a job, a node may fail. A failure of a node may cause a failure of the entire grid, and therefore a failure of the entire job, causing the job to be restarted from the beginning. For a job that includes a large data set or that may take a long period of time to complete, such a failure may be especially problematic.

BRIEF SUMMARY

The present disclosure relates to a computer technology for tolerating fault in a communications grid. Specifically, various techniques and systems are provided for detecting a fault or failure by a node in a network of computer nodes in a communications grid, adjusting the grid to avoid grid failure, and taking action based on the failure. In an embodiment, a computer-program product may be tangibly embodied in a non-transitory machine-readable storage medium. The non-transitory machine-readable storage medium may include instructions configured to cause a data processing apparatus to receive, at a backup control node connected to a primary control node and a worker node on a communications grid, grid status information, the grid status information including a project status of the primary control node or a project status of the worker node, wherein the project status of the primary control node and the project status of the worker node include a status of one or more portions of a project being executed by the primary and worker nodes in the communications grid, store the grid status information within the backup control node, receive a failure communication including an indication that the primary control node has failed, designate the backup control node as a new primary control node based on the failure communication upon receiving the failure communication, receive updated grid status information based on the indication that the primary control node has failed, wherein the updated grid status information includes an updated project status of the primary control node or an updated project status of the worker node, and transmit a set of instructions based on the updated grid status information, wherein the set of instructions includes instructions for the worker nodes to continue work on the project after failure of the primary control node.

In an aspect, the computer-program product may further comprise instructions configured to cause the data processing apparatus to receive, at the backup control node, a primary node communication including an indication that the backup control node is the new primary control node. In another aspect, upon receiving the failure communication, the backup control node determines whether the backup node should be designated as the new primary control node based on a unique identifier or rank of the backup control node, and assigning a new primary control node. In another aspect, upon receiving the failure communication, the backup control node determines that the backup control node is the only backup control node on the communications grid. In another aspect, the primary control node controls the portions of the project that each worker node is responsible for executing. In another aspect, each control node and worker node on the communications grid is assigned a unique identifier stored, wherein the unique identifiers of the nodes indicate a hierarchy of the nodes within the communications grid, and wherein each control node and each worker node store the unique identifier for every other control node and worker node on the communications grid. In another aspect, worker nodes of the worker node executes different portions of the project. In another aspect, the grid status information includes a project checkpoint (or progress checkpoint) that indicates a stage of progress of the project prior to failure of the primary control node. In another aspect, transmitting the set of instructions based on the updated grid status information includes transmitting a status from the project checkpoint that indicates the stage of progress of the project prior to the failure of the primary control node. In another aspect, the computer-program product may further comprise instructions configured to cause the data processing apparatus to determine that the primary control node has failed, wherein determining that the primary control node has failed includes determining that the backup control node did not receive an expected heartbeat communication, wherein the heartbeat communication indicates that the primary control node is operative. In another aspect, determining that the primary control node has failed includes determining that the backup control node did not receive a heartbeat communication from the primary control node after a predetermined period of time.

In another embodiment, a computing device may comprise one or more processors, and a memory having instructions stored thereon, which when executed by the one or more processors. The processor may cause the computing device to perform operations including receiving, at a backup control node connected to a primary control node and a worker node on a communications grid, grid status information, the grid status information including a project status of the primary control node or a project status of the worker node, wherein the project status of the primary control node and the project status of the worker node include a status of one or more portions of a project being executed by the primary and worker nodes in the communications grid, storing the grid status information within the backup control node, receiving a failure communication including an indication that the primary control node has failed, designating the backup control node as a new primary control node based on the failure communication upon receiving the failure communication, receiving updated grid status information based on the indication that the primary control node has failed, wherein the updated grid status information includes an updated project status of the primary control node or an updated project status of the worker node, and transmitting a set of instructions based on the updated grid status information, wherein the set of instructions includes instructions for the worker nodes to continue work on the project after failure of the primary control node.

In an aspect, the computing device may further comprise instructions, which when executed by the one or more processors, cause the computing device to perform operations including receiving, at the backup control node, a primary node communication including an indication that the backup control node is the new primary control node. In another aspect, upon receiving the failure communication, the backup control node determines whether the backup node should be designated as the new primary control node based on a unique identifier or rank of the backup control node, and assigning a new primary control node. In another aspect, upon receiving the failure communication, the backup control node determines that the backup control node is the only backup control node on the communications grid. In another aspect, the primary control node controls the portions of the project that each worker node is responsible for executing. In another aspect, each control node and worker node on the communications grid is assigned a unique identifier stored, wherein the unique identifiers of the nodes indicate a hierarchy of the nodes within the communications grid, and wherein each control node and each worker node store the unique identifier for every other control node and worker node on the communications grid. In another aspect, worker nodes of the worker node executes different portions of the project. In another aspect, the grid status information includes a project checkpoint that indicates a stage of progress of the project prior to failure of the primary control node. In another aspect, transmitting the set of instructions based on the updated grid status information includes transmitting a status from the project checkpoint that indicates the stage of progress of the project prior to the failure of the primary control node. In another aspect, the computing device may further comprise instructions, which when executed by the one or more processors, cause the computing device to perform operations including, determining that the primary control node has failed, wherein determining that the primary control node has failed includes determining that the backup control node did not receive an expected heartbeat communication, wherein the heartbeat communication indicates that the primary control node is operative. In another aspect, determining that the primary control node has failed includes determining that the backup control node did not receive a heartbeat communication from the primary control node after a predetermined period of time.

In another embodiment, a computer-implemented method may comprise receiving, at a backup control node connected to a primary control node and a worker node on a communications grid, grid status information, the grid status information including a project status of the primary control node or a project status of the worker node, wherein the project status of the primary control node and the project status of the worker node include a status of one or more portions of a project being executed by the primary and worker nodes in the communications grid, storing the grid status information within the backup control node, receiving a failure communication including an indication that the primary control node has failed, designating the backup control node as a new primary control node based on the failure communication upon receiving the failure communication, receiving updated grid status information based on the indication that the primary control node has failed, wherein the updated grid status information includes an updated project status of the primary control node or an updated project status of the worker node, and transmitting a set of instructions based on the updated grid status information, wherein the set of instructions includes instructions for the worker nodes to continue work on the project after failure of the primary control node.

In an aspect, the method may further comprise receiving, at the backup control node, a primary node communication including an indication that the backup control node is the new primary control node. In another aspect, upon receiving the failure communication, the backup control node determines whether the backup node should be designated as the new primary control node based on a unique identifier or rank of the backup control node, and assigning a new primary control node. In another aspect, upon receiving the failure communication, the backup control node determines that the backup control node is the only backup control node on the communications grid. In another aspect, the primary control node controls the portions of the project that each worker node is responsible for executing. In another aspect, each control node and worker node on the communications grid is assigned a unique identifier stored, wherein the unique identifiers of the nodes indicate a hierarchy of the nodes within the communications grid, and wherein each control node and each worker node store the unique identifier for every other control node and worker node on the communications grid. In another aspect, worker nodes of the worker node executes different portions of the project. In another aspect, the grid status information includes a project checkpoint that indicates a stage of progress of the project prior to failure of the primary control node. In another aspect, transmitting the set of instructions based on the updated grid status information includes transmitting a status from the project checkpoint that indicates the stage of progress of the project prior to the failure of the primary control node. In another aspect, the method may further comprise determining that the primary control node has failed, wherein determining that the primary control node has failed includes determining that the backup control node did not receive an expected heartbeat communication, wherein the heartbeat communication indicates that the primary control node is operative. In another aspect, determining that the primary control node has failed includes determining that the backup control node did not receive a heartbeat communication from the primary control node after a predetermined period of time.

In another embodiment, a computer-program product may be tangibly embodied in a non-transitory machine-readable storage medium. The non-transitory machine-readable storage medium may include instructions configured to cause a data processing apparatus to transmit, from a primary control node connected to one or more worker nodes on a communications grid, worker instructions related to a project being executed by the one or more worker nodes, generate a snapshot of the communications grid, wherein the snapshot of the communications grid includes a project status of each of the one or more worker nodes, wherein a project status of a worker node includes a status of a portion of the project being executed by the worker node in the communications grid, determine that a failed worker node of the one or more worker nodes has failed, wherein the one or more worker nodes has failed at a failure time, identify a project status of the failed worker node using the snapshot of the communications grid, wherein the project status of the failed worker node includes a status of a portion of the project being executed by the failed worker node at the failure time, and transmit updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

In an aspect, the computer-program product may further comprise instructions configured to cause the data processing apparatus to identify a functioning worker node of the one or more worker nodes to complete the portion of the project being executed by the failed worker node. In another aspect, each worker node on the communications grid is assigned a unique identifier, wherein the unique identifiers of the worker nodes indicate a hierarchy of the worker nodes associated with each unique identifier within the communications grid. In another aspect, the updated worker instructions facilitate a functioning worker node of the one or more worker nodes beginning execution of the portion of the project being executed by the failed worker node. In another aspect, the computer-program product may further comprise instructions configured to cause the data processing apparatus to determine that the failed worker node is the only worker node on the communications grid, and add a new worker node to the communications grid. In another aspect, the primary control node manages distribution of portions of the project that each worker node is responsible for executing. In another aspect, determining that a failed worker node of the one or more worker nodes has failed includes determining that the primary control node did not receive an heartbeat communication subsequent to transmitting the worker instructions related to the project being executed by the one or more worker nodes.

In another embodiment, a computing device may comprise one or more processors, and a memory having instructions stored thereon, which when executed by the one or more processors. The processor may cause the computing device to perform operations including transmitting, from a primary control node connected to one or more worker nodes on a communications grid, worker instructions related to a project being executed by the one or more worker nodes, generating a snapshot of the communications grid, wherein the snapshot of the communications grid includes a project status of each of the one or more worker nodes, wherein a project status of a worker node includes a status of a portion of the project being executed by the worker node in the communications grid, determining that a failed worker node of the one or more worker nodes has failed, wherein the one or more worker nodes has failed at a failure time, identifying a project status of the failed worker node using the snapshot of the communications grid, wherein the project status of the failed worker node includes a status of a portion of the project being executed by the failed worker node at the failure time, and transmitting updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

In an aspect, the computing device may further comprise instructions, which when executed by the one or more processors, cause the computing device to perform operations including identifying a functioning worker node of the one or more worker nodes to complete the portion of the project being executed by the failed worker node. In another aspect, each worker node on the communications grid is assigned a unique identifier, wherein the unique identifiers of the worker nodes indicate a hierarchy of the worker nodes associated with each unique identifier within the communications grid. In another aspect, the updated worker instructions facilitate a functioning worker node of the one or more worker nodes beginning execution of the portion of the project being executed by the failed worker node. In another aspect, the computing device may further comprise instructions, which when executed by the one or more processors, cause the computing device to perform operations including determining that the failed worker node is the only worker node on the communications grid, and add a new worker node to the communications grid. In another aspect, the primary control node manages distribution of portions of the project that each worker node is responsible for executing. In another aspect, determining that a failed worker node of the one or more worker nodes has failed includes determining that the primary control node did not receive an heartbeat communication subsequent to transmitting the worker instructions related to the project being executed by the one or more worker nodes.

In another embodiment, a computer-implemented method may comprise transmitting, from a primary control node connected to one or more worker nodes on a communications grid, worker instructions related to a project being executed by the one or more worker nodes, generating a snapshot of the communications grid, wherein the snapshot of the communications grid includes a project status of each of the one or more worker nodes, wherein a project status of a worker node includes a status of a portion of the project being executed by the worker node in the communications grid, determining that a failed worker node of the one or more worker nodes has failed, wherein the one or more worker nodes has failed at a failure time, identifying a project status of the failed worker node using the snapshot of the communications grid, wherein the project status of the failed worker node includes a status of a portion of the project being executed by the failed worker node at the failure time, and transmitting updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

In an aspect, the method may further comprise identifying a functioning worker node of the one or more worker nodes to complete the portion of the project being executed by the failed worker node. In another aspect, each worker node on the communications grid is assigned a unique identifier, wherein the unique identifiers of the worker nodes indicate a hierarchy of the worker nodes associated with each unique identifier within the communications grid. In another aspect, the updated worker instructions facilitate a functioning worker node of the one or more worker nodes beginning execution of the portion of the project being executed by the failed worker node. In another aspect, the method may further comprise determining that the failed worker node is the only worker node on the communications grid, and add a new worker node to the communications grid. In another aspect, the primary control node manages distribution of portions of the project that each worker node is responsible for executing. In another aspect, determining that a failed worker node of the one or more worker nodes has failed includes determining that the primary control node did not receive an heartbeat communication subsequent to transmitting the worker instructions related to the project being executed by the one or more worker nodes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Figure 1:
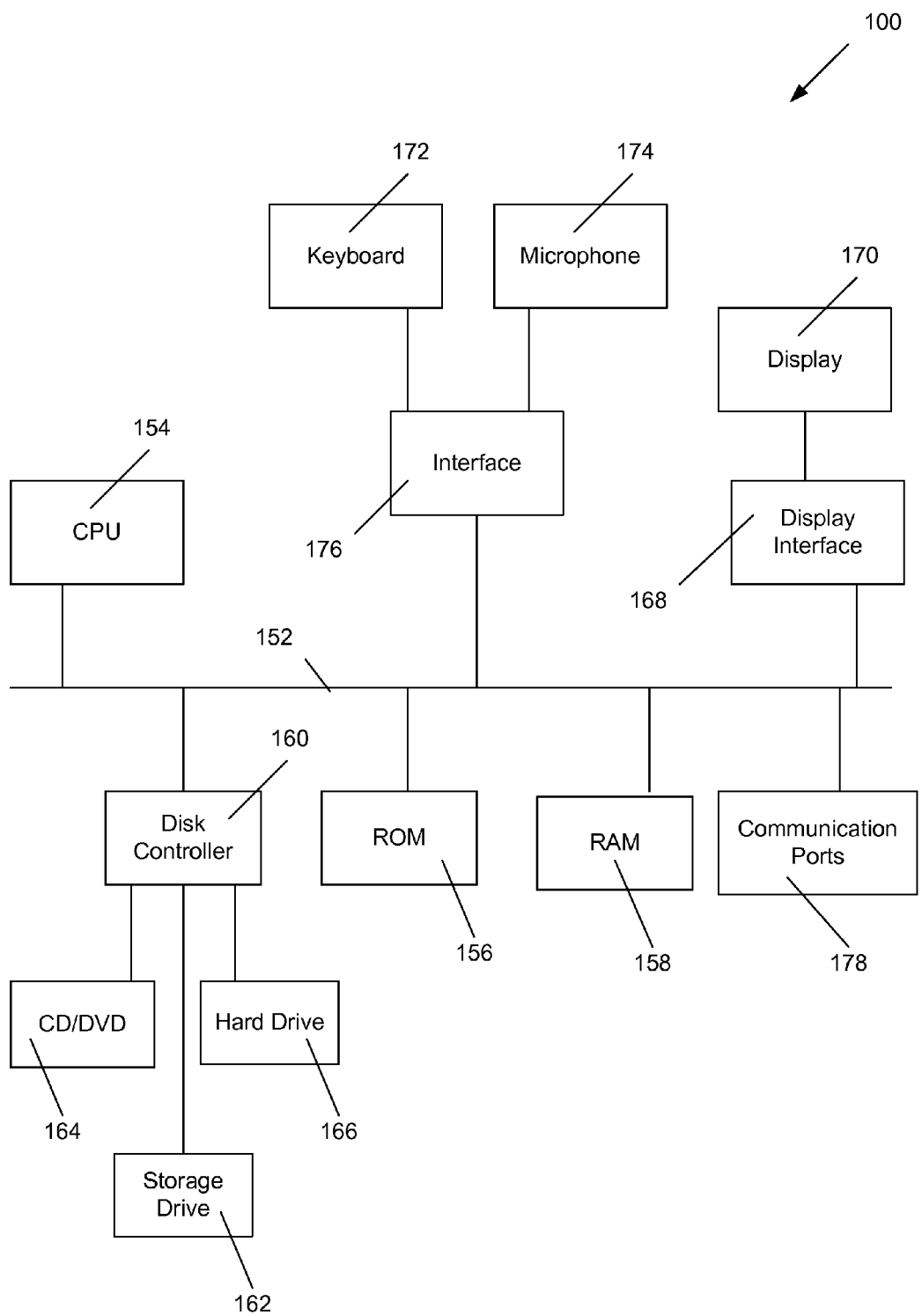
FIG. 1 illustrates an example of a block diagram bus that provides a generalized illustration of hardware and software components of a communications grid, according to embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

FIG. 1 shows a block diagram of example hardware for a stand-alone computer architecture 100, which may be used to contain and/or implement the program instructions of system embodiments of the present disclosure. More specifically, architecture 100 may be included within a node of a communications grid, as described further herein with respect to FIGS. 2-23. A bus 152 may serve as the information highway interconnecting the other illustrated components of the hardware. A processing system 154 labeled CPU (central processing unit) (e.g., one or more computer processors), may perform calculations and logic operations required to execute a program. A processor-readable storage medium, such as read only memory (ROM) 156 and random access memory (RAM) 158, may be in communication with the processing system 154 and may contain one or more programming instructions. Optionally, program instructions may be stored on a computer readable storage medium such as a magnetic disk, optical disk, recordable memory device, flash memory, or other physical storage medium. Computer instructions may also be communicated via a communications transmission, data stream, or a modulated carrier wave.

A disk controller 160 interfaces one or more optional disk drives to the system bus 152. These disk drives may be external or internal floppy disk drives such as 162, external or internal CD-ROM, CD-R, CD-RW or DVD drives such as 164, or external or internal hard drives 166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 160, the ROM 156 and/or the RAM 158. The processing system 154 may access each component as required.

A display interface 168 may permit information from the bus 156 to be displayed on a display 170 in audio, graphic, or alphanumeric format. Communication with external devices may optionally occur using various communication ports 178.

In addition to the standard computer-type components, the hardware may also include data input devices, such as a keyboard 172, or other input device 174, such as a microphone, remote control, touchpad, keypad, stylus, motion and/or gesture sensor, location sensor, still and/or video camera, pointer, mouse and/or joystick.

The present disclosure relates to a computer technology for tolerating fault in a communications grid. Specifically, various techniques and systems are provided for detecting a fault or failure by a node in a network of computer nodes in a communications grid, adjusting the grid to avoid grid failure, and taking action based on the failure. More specifically, embodiments of the methods and systems described herein include identifying or detecting a failure of a primary control node in a communications grid, and using grid status or checkpoint information to allow a backup node to take over as primary control node. The new primary control node may then control the worker nodes connected to it to complete the project being performed by the grid. Alternative embodiments include identifying or detecting a failure of a worker node in a communications grid, and using grid status or checkpoint information to allow another worker node, under the control and supervision of a control node, to take over the work being performed by the failed worker node. The work may be redistributed amongst the operational worker nodes. Alternative embodiments include using thresholds to determine when, after a predetermined amount of time, it should be established or assumed that a node has failed. Such a determination may allow a backup control node to take over for a failed primary control node, or a control node to redistribute work being performed by a failed worker node to another worker node. The nodes within the communications grid may be able to detect a hierarchy or perform other methods for determining which nodes should take action after a failure. Such embodiments of the present technology are described herein with respect to FIGS. 2-23.

Various communications grids described herein are described as including one or more control nodes (e.g., a primary control node, backup control node, etc.) and one or more worker nodes. A node may be, for example, a computing device such as a computer, or a different type of network or electronic device such as, for example, a server or router. Control nodes may maintain knowledge of the status of the nodes in the grid (e.g., grid status information), accept work requests from clients, subdivide the work across worker nodes (both initially and after a worker node failure), coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

To add another node or machine to the grid, the primary control node may open a pair of listening sockets, for example. The sockets may be used for different reasons related to the jobs of the control node. The first of these sockets may be used to accept work requests from clients, and the second socket may be used to accept connections from other grid nodes (e.g., worker nodes or other control nodes). The primary control node may be provided with a list of other nodes (e.g., other machines, computers, servers) that will participate in the grid, and the role that each node will fill in the grid. The primary control node may maintain a database of all configured nodes in the grid. The database may be in a variety of forms, including, for example, a memory table, a simple text file, a full configuration file, on a configuration server, among others. Upon startup of the primary control node (e.g., the first node on the grid), the primary control node may use a network protocol (e.g., Secure Shell Protocol, or SSH) to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. Authentication of a node is described further herein with respect to FIGS. 16 and 17. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). Authentication of a node is described further herein with respect to FIGS. 16 and 17. After successful authentication, the worker node may accept configuration information from the control node.

The grid may add new machines at any time, initiated from any control node. Upon adding a new node to the grid, the control node may first add the new node to its table of grid nodes. The control node may also then notify every other control node about the new node. The nodes receiving the notification may acknowledge that they have updated their configuration information.

Figure 2:
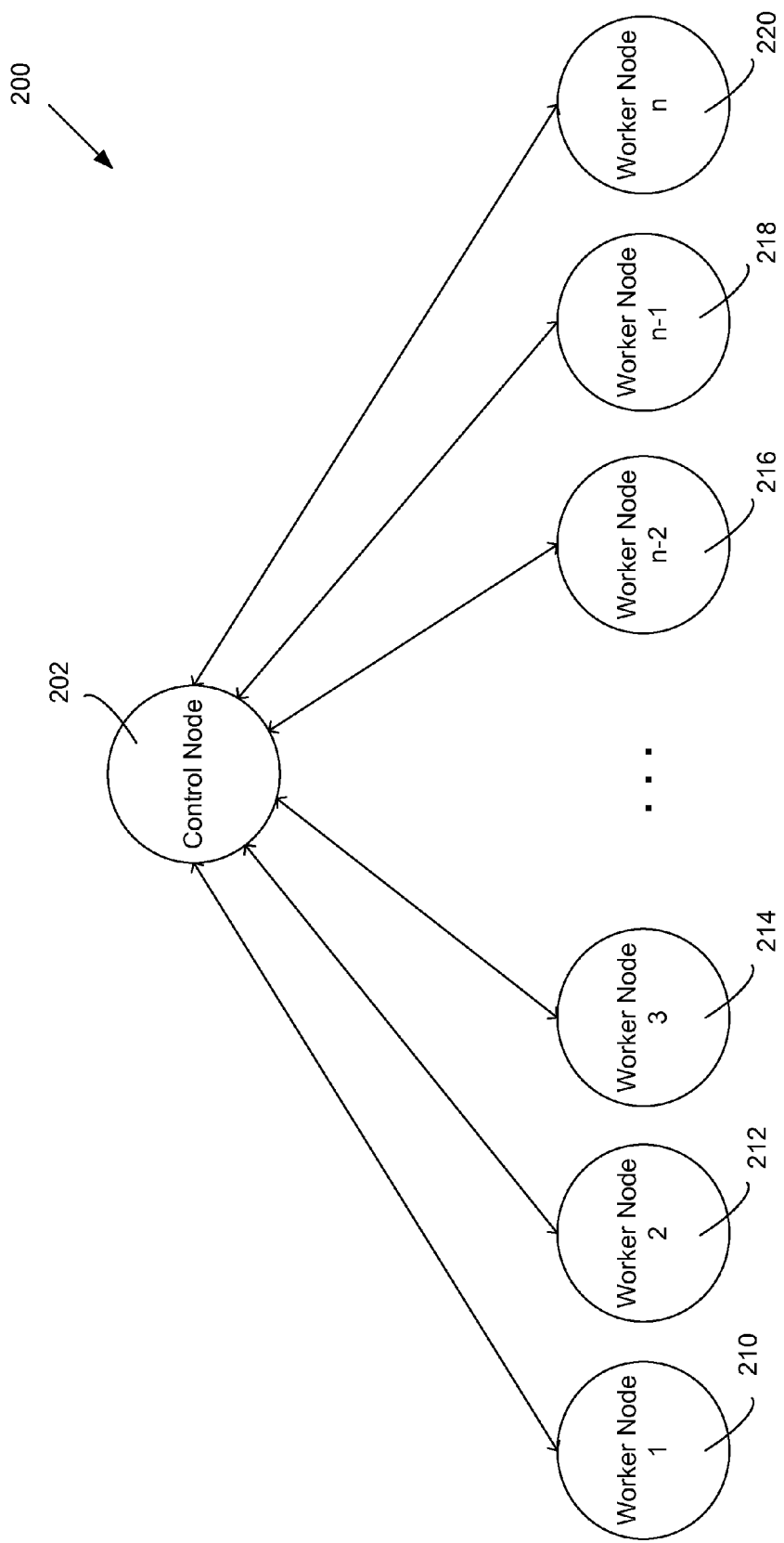
FIG. 2 illustrates an example of a communications grid including a control node and one or more worker nodes, according to embodiments of the present technology.

FIG. 2 illustrates a communications grid 200 including a control node and one or more worker nodes, according to embodiments of the present technology. Communications grid 200 includes control node 202, labeled as control node A. Communications grid 200 also includes one or more worker nodes. Shown in FIG. 2 are six worker nodes, worker node 210 (labeled as worker node 1), worker node 212 (labeled as worker node 2), worker node 214 (labeled as worker node 3), worker node 216 (labeled as worker node n−2), worker node 218 (labeled as worker node n−1), and worker node 220 (labeled as worker node n). Although FIG. 2 shows six worker nodes, a communications grid according to embodiments of the present technology may include more or less than six worker nodes. For example, a communications grid may include one, two, or any other number of worker nodes. Each worker node within the communications grid 200 is connected (wired or wirelessly, and directly or indirectly) to control node 202. Therefore, each worker node may receive information from control node 202 (e.g., an instruction to perform work on a project) and may transmit information to control node 202 (e.g., a result from work performed on a project). However, in certain embodiments, worker nodes may not, for example, be connected (communicatively or otherwise) to other worker nodes. For example, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid. In alternative embodiments, worker nodes may communicate with each other (either directly or indirectly). For example, worker nodes may transmit data between each other related to a job being performed or an individual task within a job being performed by that worker node. Alternatively, worker nodes may communicate with each other to perform broadcast or reduction operations, for example such as those discussed herein with respect to FIGS. 22 and 23, respectively.

A control node, such as control node 202, may connect with an external device with which the control node may communicate (e.g., a grid user, such as a server or computer, may connect to a primary controller of the grid). For example, a server or computer may connect to control node 202 and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node). Such a structure may prevent a bottleneck problem.

When a project is initiated on communications grid 200, control node 202 controls the work to be performed for the project (e.g., on the data set). Since the worker nodes in the communications grid 200 will perform the work to complete each task within the project, control node 202 assigns work from the project to each worker node. Control node coordinates the work such that each worker node has a portion of the project that the worker node can handle and can execute and in the amount of time desired by the user or by the control node. For example, the control node may distribute work to the worker nodes based on various factors, such as which subsets or portions of projects may be completed most efficiently and in the correct amount of time. For example, a worker node may perform analysis on a portion of data that is already local (e.g., stored on) the worker node. The control node also coordinates the results of the work performed by each worker node after each worker node executes and completes its job. For example, the control node may receive a result from one or more worker nodes, and the control node may organize the results received and compile them to produce a complete result for the project received from the end user.

The worker nodes within communications grid 200 perform work on the portion of the project that is assigned to the worker node by control node 202. After the worker node receives an instruction or project (or portion of a project) from the control node, the worker node executes the instruction as assigned, and may produce a result. The worker node may then transmit the result back to the control node 202 (or to any other network device or external device as designated by the assignment or instructions from control node 202 that was delivered with or after the assignment).

When a node joins the communications grid 200 (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

When a project is submitted for execution (e.g., by a client or a controller of the grid) it may be assigned to a set of nodes. One of the control nodes may be assigned as a primary control node for the job. Any remaining control nodes may be assigned as backup control nodes for the project. All active worker nodes may be assigned to the project. However, in some embodiments, a subset of worker nodes may be assigned to the project for projects requiring lower resources. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

Within a communicator, each worker node and the primary control node may each be assigned a rank. Each rank, for example, may be a non-negative integer. When combined with a communicator handle, a node's rank may be used to communicate with a the code running in the same project on another node. Unlike a unique identifier assigned to the node, a rank may only be unique within a communicator. Therefore, the same rank number may refer to different nodes in the grid across different projects. When the project code identifies a specific node in the grid, it may use the UUID that is assigned to that node since such UUIDs may be permanent.

As noted, communications grid 200 includes a single control node, control node 202. Therefore, if control node 202 fails, for example if control node 202 is shut off, breaks, or otherwise fails or becomes unavailable to control and coordinate the worker nodes that are connected to it, then the communications grid 200 may fail. In other words, if control node 202 fails, then any project or job being run on communications grid 200 may fail and may not complete. While the project may be run again, such a failure may cause a delay (severe delay in some cases, such as overnight delay) in completion of the project. Therefore, a fault tolerant system with multiple control nodes, including a backup control node, may be beneficial.

Figure 3:
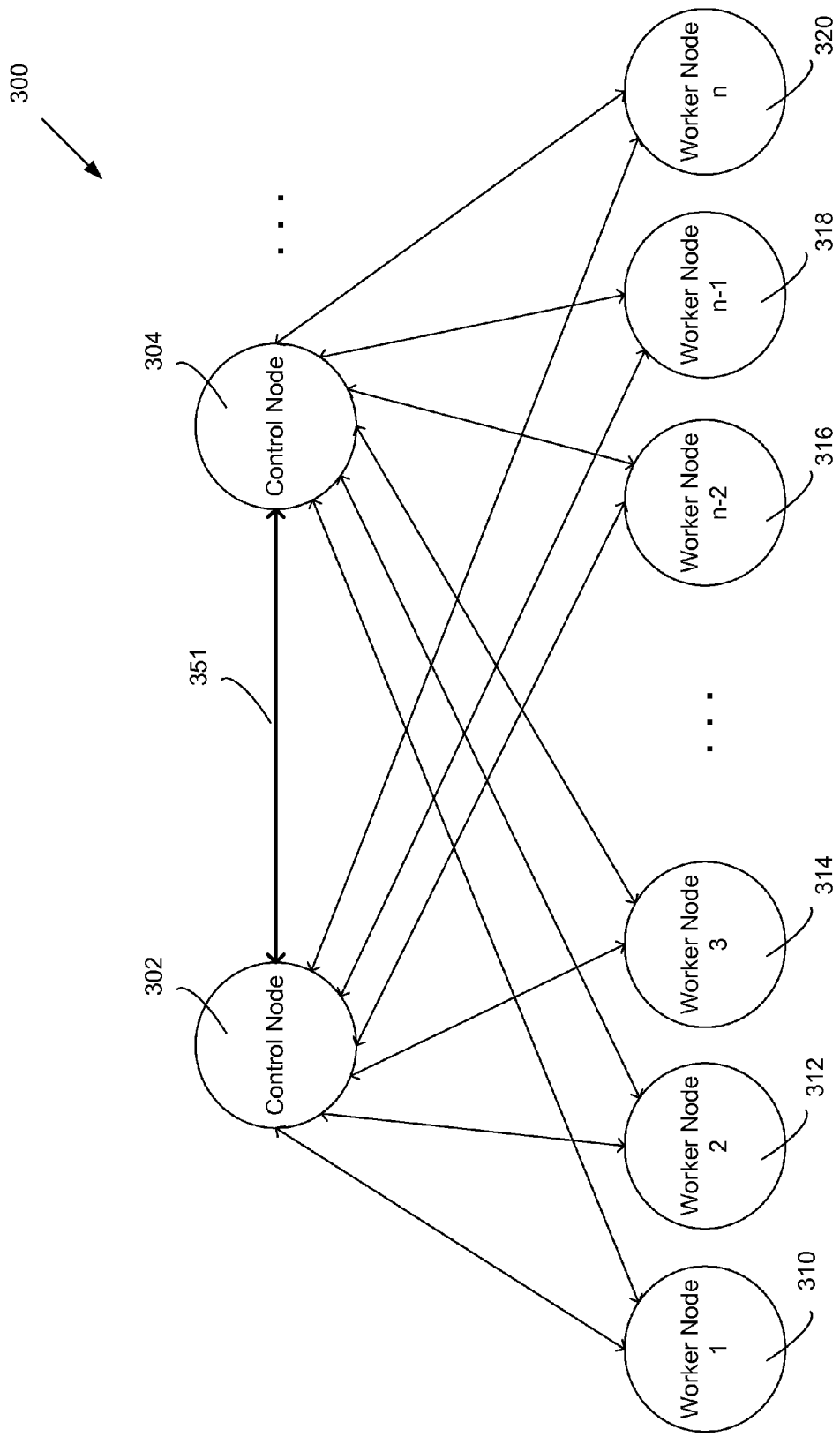
FIG. 3 illustrates an example of a communications grid including two control nodes and one or more worker nodes, according to embodiments of the present technology.
Figure 7:
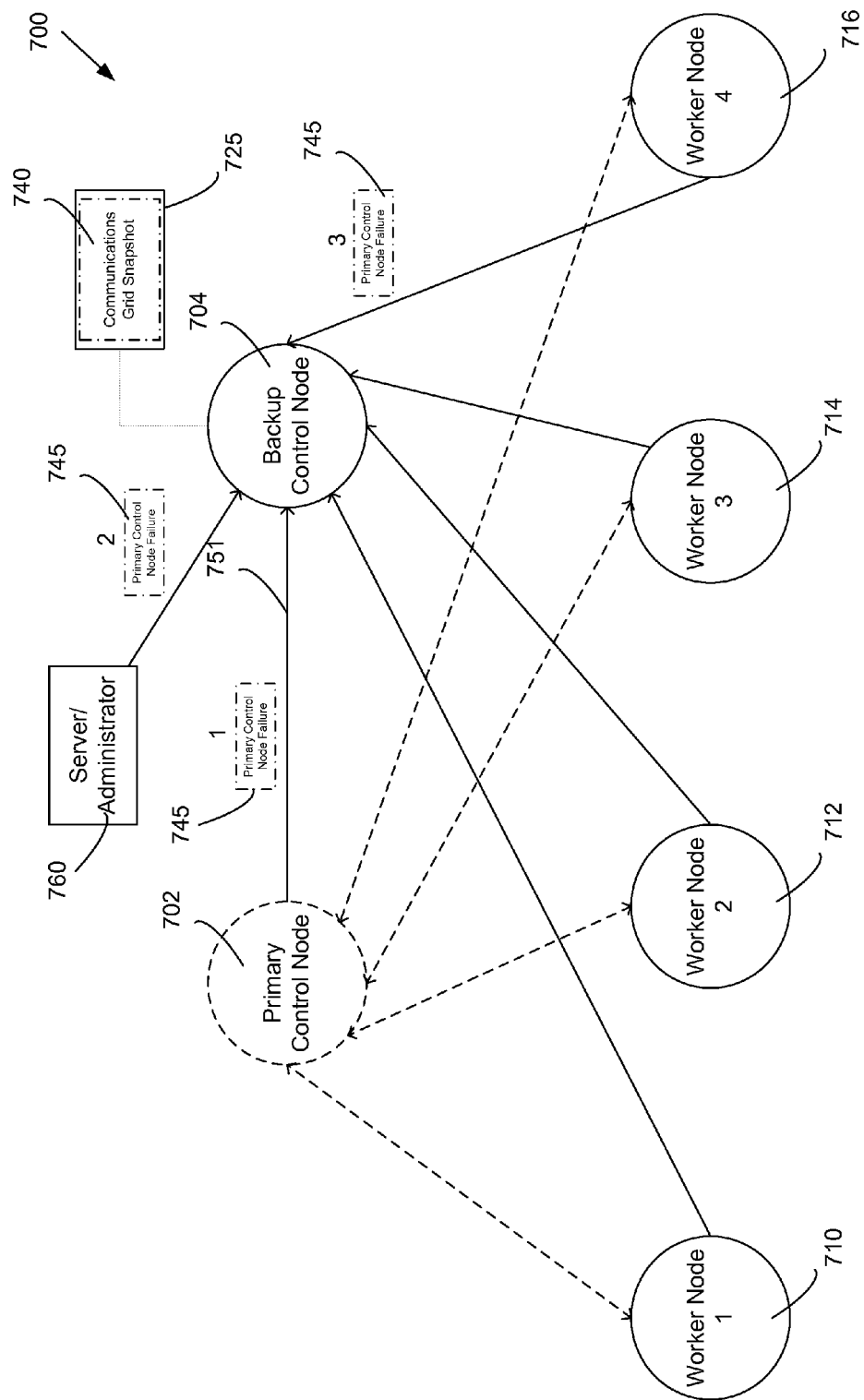
FIG. 7 illustrates an example of a communications grid including two control nodes, including a backup control node with a stored grid snapshot, and one or more worker nodes, according to embodiments of the present technology.

FIG. 3 illustrates a communications grid 300 including two control nodes and one or more worker nodes, according to embodiments of the present technology. Communications grid 300 includes control node 302 and control node 304. Control node 302 and control node 304 are communicatively connected via communication path 351. Therefore, control node 302 and control node 304 may transmit information, including information related to the communications grid or notifications, to and receive information from each other. Although communications grid 300 is shown in FIG. 3 as including two control nodes, the communications grid may include more than two control nodes (for example, as shown in FIG. 7) or less than two control nodes (as shown, for example, in FIG. 5).

Communications grid 300 also includes one or more worker nodes. Shown in FIG. 3 are six worker nodes: worker node 310 (or worker node 1), worker node 312 (or worker node 2), worker node 314 (or worker node 3), worker node 316 (or worker node n–2), worker node 318 (or worker node n–1), and worker node 320 (or worker node n). Although FIG. 3 shows six worker nodes, a communications grid according to embodiments of the present technology may include more or less than six worker nodes. For example, a communications grid may include one, two, or any other number of worker nodes. For example, the number of worker nodes included in a communications grid may be dependent upon how large the project or data set is being implemented by the communications grid. The number of worker nodes included in a communications gird may also be dependent upon other factors, such as the capacity of each worker node, the time in which the communications grid would like to complete the project, among others.

As noted, each worker node within the communications grid 300 may be connected to control node 302 (although in other embodiments only some worker nodes may be connected to control node 302). Therefore, each worker node may receive information from control node 302 (e.g., an instruction to perform work on a project) and may transmit information to control node 302 (e.g., a result from work performed on a project). However, worker nodes may not, in certain embodiments, be connected (communicatively or otherwise) to other worker nodes. For example, worker nodes may only be connected to the control node that controls it, and may not be connected to other worker nodes in the communications grid, whether they share a control node or not. Each worker node within the communications grid 300 is also connected to control node 304. Therefore, each worker node may receive information from control node 304 and may transmit information to control node 304.

A control node, such as control node 302, may be designated as the primary control node. A server, computer or other external device may connect to the primary control node, such as control node 302. Once the control node receives a project, the primary control node may distribute portions of the project to its worker nodes for execution. For example, when a project is initiated on communications grid 300, primary control node 302 controls the work to be performed for the project in order to complete the project as requested or instructed. Since the worker nodes in the communications grid 300 will perform the work to complete each task within the project, primary control node 302 may assign work from the project to each worker node. The primary control node coordinates the work such that each worker node has a portion of the project that the worker node can handle and can fully execute efficiently. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Another control node, such as control node 304, may be designated as the backup control node. Backup control node 304 may not control any portion of a project being implemented by communications grid 300. Instead, backup control node 304 may serve as a backup for primary control node 302. For example, backup control node 304 may be able to take over as primary control node if primary control node 302 were to fail. Primary control node 302 may, for example, transmit one or more communications to backup control node 304 (and, for example, to other control or worker nodes within the communications grid). Such communications may sent periodically, at fixed time intervals, between known fixed stages of the project's execution, among other protocols. The communications transmitted by primary control node 302 may be of varied types and may include a variety of types of information. For example, primary control node 302 may transmit snapshots (e.g., status information) of the communications grid so that backup control node 304 always has a recent snapshot of the communications grid. The snapshot or grid status may include the structure of the grid (including, for example, the worker nodes in the grid, unique identifiers of the nodes, or their relationships with the primary control node), the status of a project (including, for example, the status of each worker node's portion of the project), among other information related to the communications grid or its nodes. The snapshot may also include analysis or results received from worker nodes in the communications grid for either partial of whole portions of the project. The backup control node 304 may receive and store the backup data received from the primary control node 302. The backup control node 304 may request such a snapshot (or other information) from the primary control node, or the primary control node may send such information periodically to the backup control node.

As noted, the backup data may allow the backup control node to take over as primary control node if the primary control node fails. More specifically, the backup data may allow the backup control node to continue the project being implemented and controlled by the primary control node after a failure of the primary control node without having to start the project over from scratch. If the primary control node fails, the backup control node 304 may retrieve the most recent version of the snapshot received from the primary control node 302 and use the snapshot to continue the project from the stage of the project indicated by the backup data.

Backup control node 304 may use various methods to determine that primary control node 302 has failed. In one example of such a method, primary control node 302 may transmit a communication to the backup control node 304 that indicates that the primary control node 302 is working and has not failed, such as a heartbeat communication. This type of communication may be transmitted by the primary control node periodically (e.g., once every second, once every five seconds, once every millisecond, or any other interval). Backup control node 304 may be able to determine if primary control node 302 has failed if backup control node 304 has not received a heartbeat communication for a certain predetermined period of time (i.e., a time or heartbeat threshold), or in other words, has not received a heartbeat communication that it expected to receive before a certain amount of time has passed. For example, primary control node 302 may transmit a heartbeat message every sixty seconds. If backup control node 304 has not received a heartbeat message from primary control node 302 for a period of more than sixty seconds, for example seventy seconds, then backup control node 304 may determine or assume that primary control node 302 has failed.

As another example of a method, backup control node 304 may use to determine or assume that primary control node 302 has failed, backup control node 304 may receive a communication from one or more worker nodes, which may be connected to both primary control node 302 and to backup control node 304, that primary control node 302 has failed. For example, a worker node may have recognized that primary control node 302 failed to communicate with the worker node. For example, primary control node 302 may have failed to respond to a query or request transmitted by the worker node to the primary control node. In another example, the primary control node 302 may have failed to transmit an acknowledgement (e.g., ACK) message back to the worker node after the worker node sent a communication (e.g., a communication including results from a portion of a job being worked on by the worker node). The backup control node 304 may have also, for example, received a communication that the primary control node failed from another device, such as a device external to the communications grid. For example, an external device (e.g., a controller) may have received an indication from one or more worker nodes that the primary control node failed, and the external device may have transmitted a communication to the backup control node that the primary control node failed. Backup control node 304 may have also received an indication from primary control node 302 (or elsewhere) directly that the primary control node has or is going to fail. For example, the primary control node (or another device) may be able to predict, based on historical data or detected patterns, that the primary control node is going to fail. However, before it fails, the primary control node may transmit (e.g., broadcast or via direct message to other nodes) a communication including an indication that it has or is going to fail.

As noted, after backup control node 304 detects or is notified that primary control node 302 has failed, backup control node 304 may take over the responsibilities of the primary control node. Furthermore, control node 304 may continue the project that was being implemented by the communications grid 300 and controlled by control node 302 by using data (e.g., status information) received from the primary control node before it failed. As such, the communications grid may be able to avoid failure of the project due to a failure in the primary control node.

Figure 4:
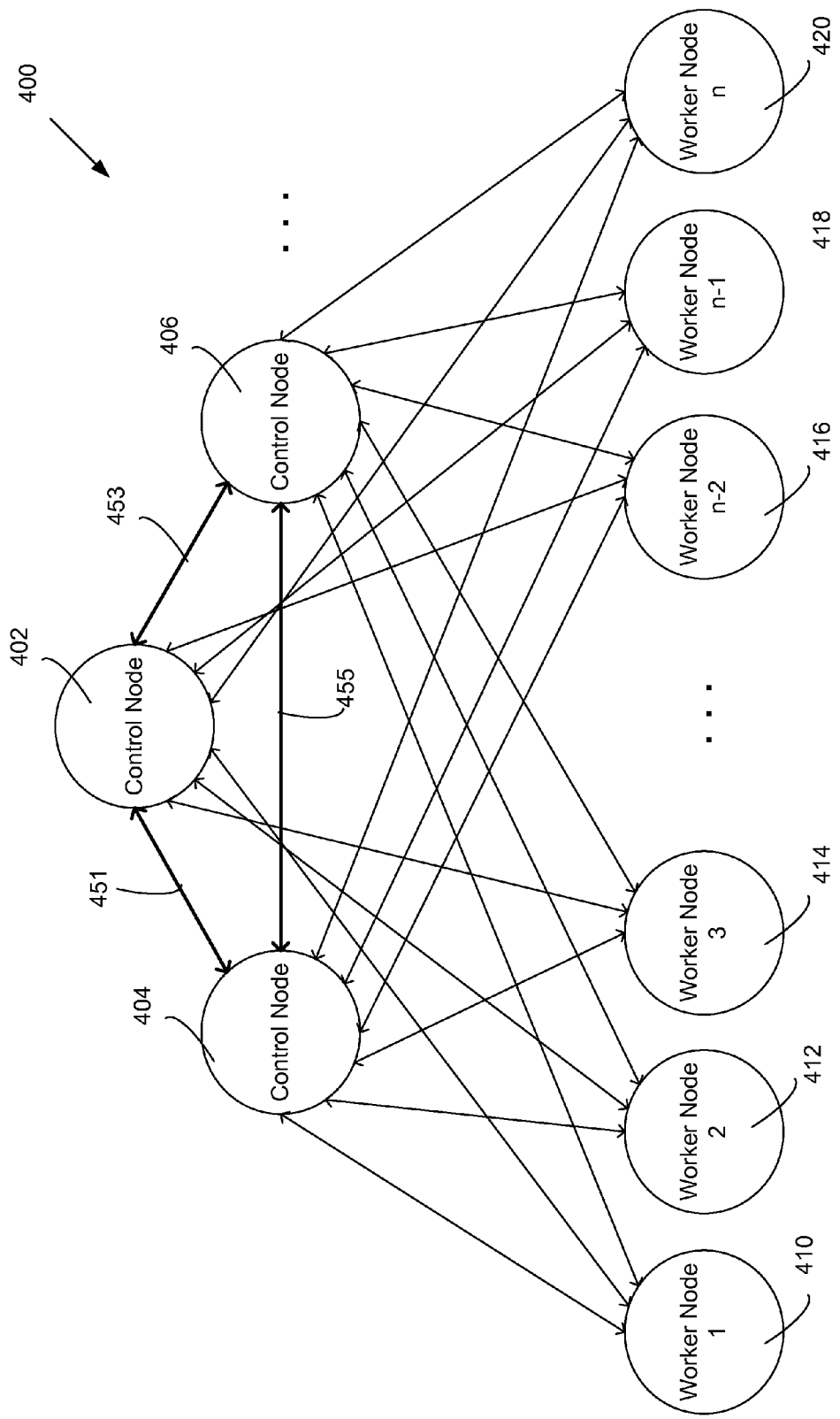
FIG. 4 illustrates an example of a communications grid including three control nodes and one or more worker nodes, according to embodiments of the present technology.

FIG. 4 illustrates a communications grid 400 including three control nodes and one or more worker nodes, according to embodiments of the present technology. Communications grid 400 includes control node 402, control node 404 and control node 406. Control node 402 and control node 404 are communicatively connected via communication path 451. Therefore, control node 402 and control node 404 may transmit information, communications path 451, including information related to the communications grid or notifications, to and receive information from each other. Control node 402 and control node 406 are communicatively connected via communication path 453. Therefore, control node 402 and control node 406 may transmit information, via communication path 453, including information related to the communications grid or notifications, to and receive information from each other. Control node 404 and control node 406 are communicatively connected via communication path 455. Therefore, control node 404 and control node 406 may transmit information, via, communications path 455, including information related to the communications grid or notifications, to and receive information from each other. Although communications grid 600 is shown in FIG. 6 as including three control nodes, the communications grid may include more than three control nodes or less than two control nodes (as shown, for example, in FIGS. 5 and 6).

Communications grid 400 also includes one or more worker nodes. Shown in FIG. 4 are six worker nodes: worker node 410 (or worker node 1), worker node 412 (or worker node 2), worker node 414 (or worker node 3), worker node 416 (or worker node n−2), worker node 418 (or worker node n−1), and worker node 420 (or worker node n). Although FIG. 4 shows six worker nodes, a communications grid according to embodiments of the present technology may include more or less than six worker nodes. For example, a communications grid may include one, two, or any other number of worker nodes. For example, the number of worker nodes included in a communications grid may be dependent upon how large the project or data set is being implemented by the communications grid. The number of worker nodes included in a communications grid may also be dependent upon other factors, such as the capacity of each worker node, the time designated for the communications grid to complete the project, among others.

Figure 5:
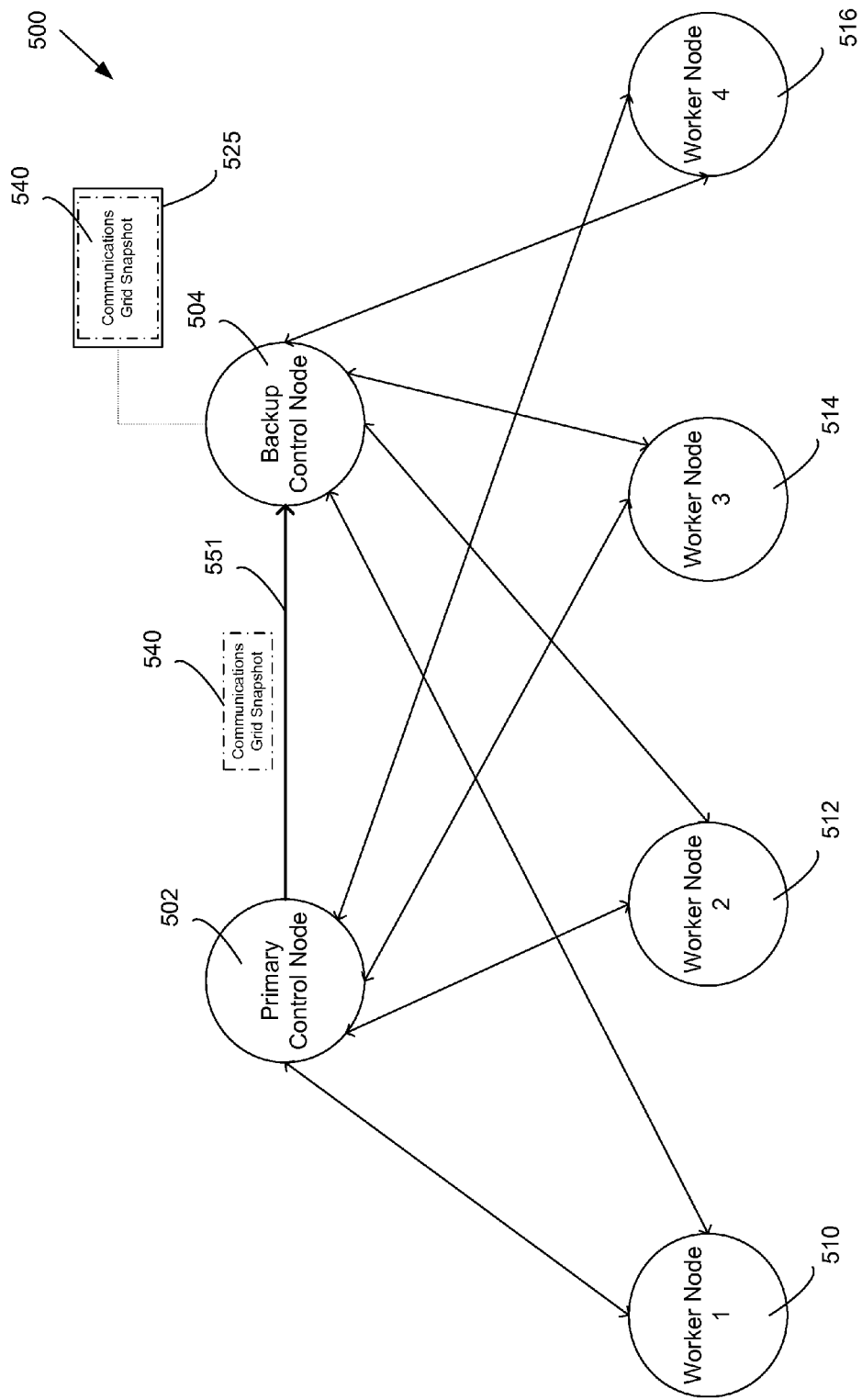
FIG. 5 illustrates an example of a communications grid including two control nodes, including a backup control node with a stored grid snapshot, and one or more worker nodes, according to embodiments of the present technology.
Figure 6:
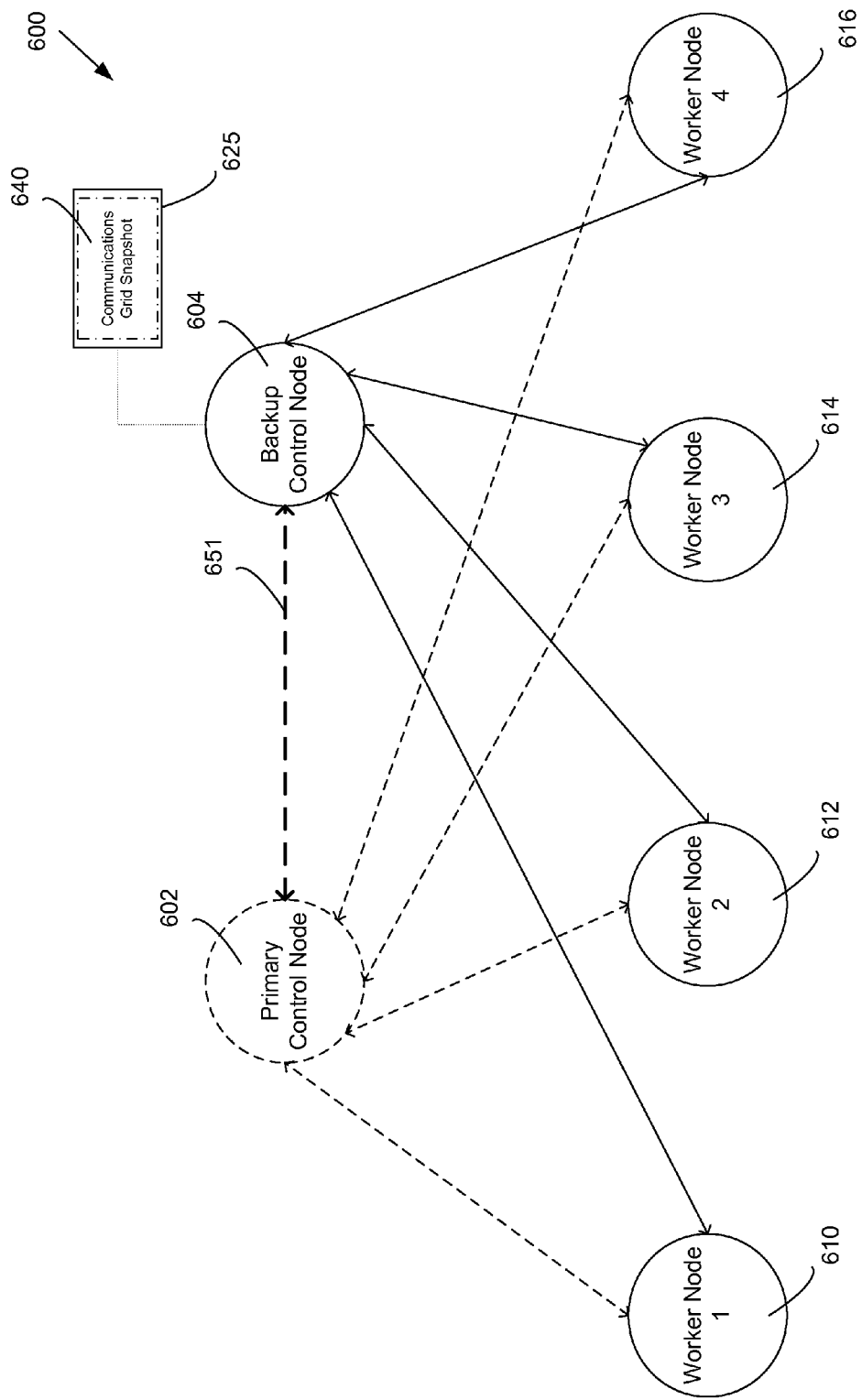
FIG. 6 illustrates an example of a communications grid including two control nodes, including a backup control node with a stored grid snapshot, and one or more worker nodes, according to embodiments of the present technology.

Similar to control node 602 in FIG. 6, a control node, such as control node 402, may be designated as the primary control node in communications grid 400. Primary control node 402 may be configured to have a similar role (and perform the same or similar functions) in communications grid 400 as primary control node 602 in communications grid 600 as described with respect to FIG. 6 (and as control node 502 in FIG. 5). The other two control nodes in communications grid 400, such as control nodes 404 and 406, may be designated as backup control nodes. Control nodes 404 and 406 may be referred to herein as backup control nodes. However, control nodes 404 and 406 may be primary control nodes in other embodiments In such an embodiment where control nodes 404 and 406 are backup control nodes, each of the backup control nodes 404 and 406 may perform similar functions, either individually or in combination, to backup control node 304 in communications grid 300. For example, backup control nodes 404 and 406 may each receive information regarding the communications grid 400, including periodic snapshots or other information about the communications grid, from the primary control node 402.

Either backup control node 404 or backup control node 406 may, similar to backup control node 304 in communications grid 300, take over or substitute for primary control node 402 if primary control node 402 were to fail. The backup control node that takes over for a failed primary control node 402 may do so such that it may perform similar functions to backup control node 304 in communications grid 300 after a failure of primary control node 302, and thus may continue the functions or projects being performed by failed primary control node 402. For example, the backup control node, either backup control node 404 or backup control node 406, may control the worker nodes that were connected to primary control node 402 before primary control node 402 failed (and which, as noted, may also be connected to control nodes 404 and 406) and control the project or projects being performed by those worker nodes.

Different methods may be performed to determine which backup control node of a set of backup control nodes (e.g., backup control nodes 404 and 406) will take over for failed primary control node 402 and become the new primary control node. For example, the new primary control node may be chosen based on the unique identifiers assigned to each backup control node (e.g., whichever backup control node has the higher or lower unique identifier). Such a ranking of unique identifiers may be called a "hierarchy" of the backup control nodes. In an alternative embodiment, a backup control node may be assigned to be the new primary control node by another device in the communications grid (e.g., the failed primary control node 402) or from an external device (e.g., a system infrastructure or an end user, such as a server or computer, controlling the communications grid). In another alternative embodiment, the backup control node that takes over as the new primary control node may be designated based on bandwidth or other statistics about the communications grid. For example, the decision may be based on which node has more bandwidth, which node includes a more recent version of a snapshot of the communications grid, which node is better equipped (e.g., using statistics about the node or the rest of the communications grid) to handle the current project being executed by the communications grid, among others. Since the backup control nodes may communicate with each other (e.g., via communication paths 451, 453 and 455), an internal algorithm may be executed, or information may be shared between the backup control nodes, to designate one of the backup control nodes as the new primary control node.

FIG. 5 illustrates a communications grid 500 including two control nodes and one or more worker nodes, according to embodiments of the present technology. Communications grid 500 includes primary control node 502 and backup control node 504. Primary control node 502 and backup control node 504 may have similar roles in communications grid 500 as control nodes 602 and 604, respectively, in communications grid 600 in FIG. 6. Primary control node 502 and backup control node 504 are communicatively connected via communication path 551. Therefore, primary control node 502 and backup control node 504 may transmit information, including information related to the communications grid or notifications, to and receive information from each other. Although communications grid 500 is shown in FIG. 5 as including two control nodes, the communications grid may include more than two control nodes (for example, as shown in FIG. 4) or less than two control nodes (as shown, for example, in FIG. 5).

Communications grid 500 also includes one or more worker nodes. Shown in FIG. 5 are four worker nodes: worker node 510 (or worker node 1), worker node 512 (or worker node 2), worker node 514 (or worker node 3), and worker node 516 (or worker node 4. Although FIG. 5 shows four worker nodes, a communications grid according to embodiments of the present technology may include more or less than four worker nodes.

As noted, a primary control node (e.g., primary control node 502) may transmit snapshots of the communications grid so that a backup control node (e.g., backup control node 504) always has a recent snapshot of the communications grid. For example, as shown in FIG. 5, primary control node 502 may transmit communications grid snapshot 540 to backup control node 504. The snapshot may include the structure of the grid including the worker nodes in the grid and their relationships with the primary control node, the status of a project (including, for example, the status of each worker node's portion of the project), among other information. The snapshot may also include analysis or results received from worker nodes in the communications grid for either partial of whole portions of the project. The snapshot may also include any other information that assists the backup control node to continue processing the job from a known state of the job after a primary control node failure. The backup control node 504 may receive and store snapshot 540 received from the primary control node 502. The backup control node 504 may initiate a receipt of a snapshot of the communications grid by requesting such a snapshot (or other information) from the primary control node, or the primary control node may send such information periodically to the backup control node. Backup control node 504 may store snapshot 540 in storage, such as in local storage 525. Local storage 525 may be a short term storage, such as cache, or a more long term storage within backup control node 504. In an alternative embodiment, backup control node 504 may store snapshot 540 (or other data) in a remote location. For example, backup control node 504 may, after receiving communications grid snapshot 540 from primary control node 502, transmit snapshot 540 to a storage external to backup control node 504. Backup control node 504 may then, upon receiving or detecting a notification of a failure of a primary control node, retrieve a stored grid snapshot, such as snapshot 540, from storage.

FIG. 6 illustrates a communications grid 600 including two control nodes, including a backup control node with a stored grid snapshot, and one or more worker nodes, according to embodiments of the present technology. More specifically, FIG. 6 illustrates that primary control node 602 may fail (indicated by dotted lines), and therefore that communication paths between the primary control node 602 and other nodes on the communications grid (e.g., path 651 between primary control node 602 and backup control node 604 as well as those paths between primary control node 602 and worker nodes 610-616) may be severed because of such a failure. However, as shown in communications grid 600, backup control node 604 may be communicatively connected (e.g., wired or wirelessly) to each of the worker nodes within communications grid 600. As noted, the backup data may allow the backup control node to take over as primary control node if the primary control node fails. More specifically, the backup data may allow the backup control node to continue the project being implemented and controlled by the primary control node after a failure of the primary control node without having to start the project over from scratch. If the primary control node fails, the backup control node 504 may retrieve the most recent version (or another stored version, if applicable) of the snapshot received from the primary control node 502 and use the snapshot (and other backup data) to continue the project from the stage of the project indicated by the backup data.

FIG. 7 illustrates a communications grid 700 including two control nodes, including a backup control node with a stored grid snapshot and one or more worker nodes, according to embodiments of the present technology. Communications grid 700 is similar to communications grid 600, but further illustrates that backup control node 704 may receive notification of a failure of the primary control node 702 from several different sources. As noted, a backup control node (e.g., backup control node 704) may replace a primary control node (e.g., primary control node 702) as a new primary control node within the communications grid (e.g., communications grid 700) upon the failure of the primary control node. Backup control node 704 may be notified that primary control node 702 has failed in a variety of different ways. For example, backup control node 704 may receive a communication including a notification, such as communication 745, including an indication that primary control node 702 has failed or will fail within a certain amount of time. Backup control node 704 may receive such a notification from primary control node 702 itself. Primary control node 702 may identify that it has or will fail and subsequently or simultaneously transmit a notification of this issue to backup control node 704, to another node or group of nodes on the grid, or to a server or administrator (e.g., server/administrator 760) or another system infrastructure internal or external to the communications grid. Backup control node may then receive a communication 745 from the server or administrator 760. For example, such a notification may come after the server or administrator 760 has received such a notification from the primary control node 702. Alternatively, the server or administrator 760 may have received such a notification from a worker node within the grid, or from another source. In another alternative example, the server or administrator 760 may transmit periodic heartbeat messages to the primary control node 702 to determine whether primary control node 702 is working (i.e. has not failed), and may have initiated a notification transmitted to backup control node 704 because it determined that primary control node 702 failed since it did not receive a response to one or more of its heartbeat messages for a certain predetermined period of time. Backup control node 704 may then receive a notification of a primary control node failure directly from a worker node, such as from worker node 716 as shown in FIG. 7.

Figure 8:
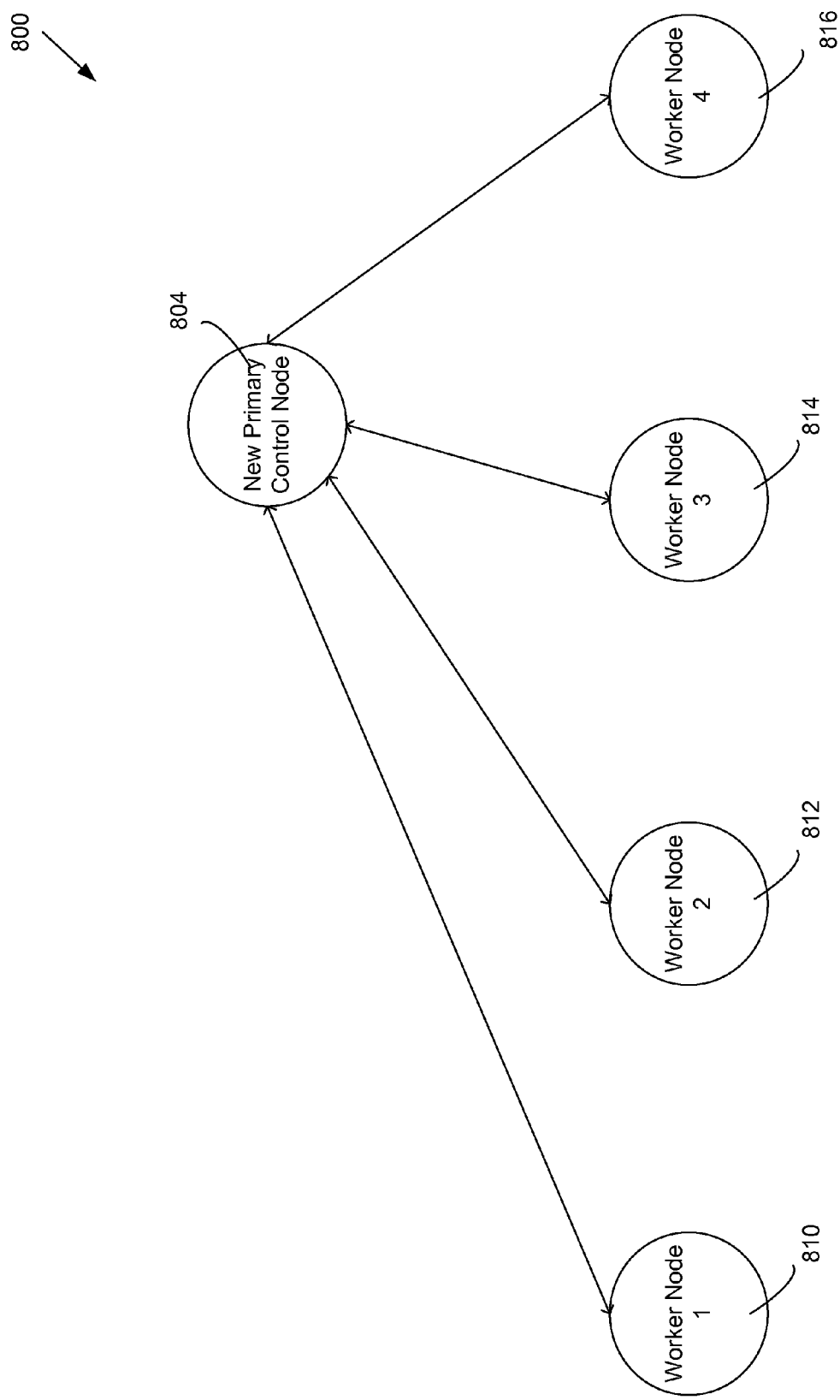
FIG. 8 illustrates an example of a communications grid including a new primary control node and former backup control node, and one or more worker nodes, according to embodiments of the present technology.

FIG. 8 illustrates a communications grid 800 including a new primary control node and former backup control node, and one or more worker nodes, according to embodiments of the present technology. Communications grid 800 includes new primary control node 804, which may have transitioned from being a former backup control node before a previous primary control node failed. As shown in FIG. 8, new primary control node 804 is, as it was when it was a backup control node, connected to one or more worker nodes. In communications grid 800, new primary control node 804 is connected to worker nodes 810, 812, 814, and 816. However, new primary control node 804 may be connected to a fewer or greater number of worker nodes than the four worker nodes shown in FIG. 8. New primary control node 804 may substitute or take over for a previous primary control node in the same capacity or functionality as the former, now failed, primary control node. In other words, new primary control node 804 may control the project being run on the communications grid 800, and therefore may control the worker nodes connected to it and executing different portions of the project.

New primary control node 804, upon becoming the primary control node within communications grid 800, may begin the project anew (for example, if the last known state of the grid as stored by the new primary control node is the beginning of the project). In another embodiment, new primary control node 804 may roll back to a checkpoint by resuming work on the project at a checkpoint at some point during the progress of the project being executed. In an embodiment, new primary control node 804 may resume execution of the project, along with the worker nodes connected to it, from the exact point where the former primary control node left off. In another embodiment, new primary control node 804 may resume execution of the project from a checkpoint (i.e., rolling back to a checkpoint) that is at a point in the project previous to the point where the previous primary control node left off. The new primary control node 804 may obtain information about this checkpoint using a snapshot of the grid retrieved from storage within new primary control node 804 or from storage within another node or another device.

Figure 9:
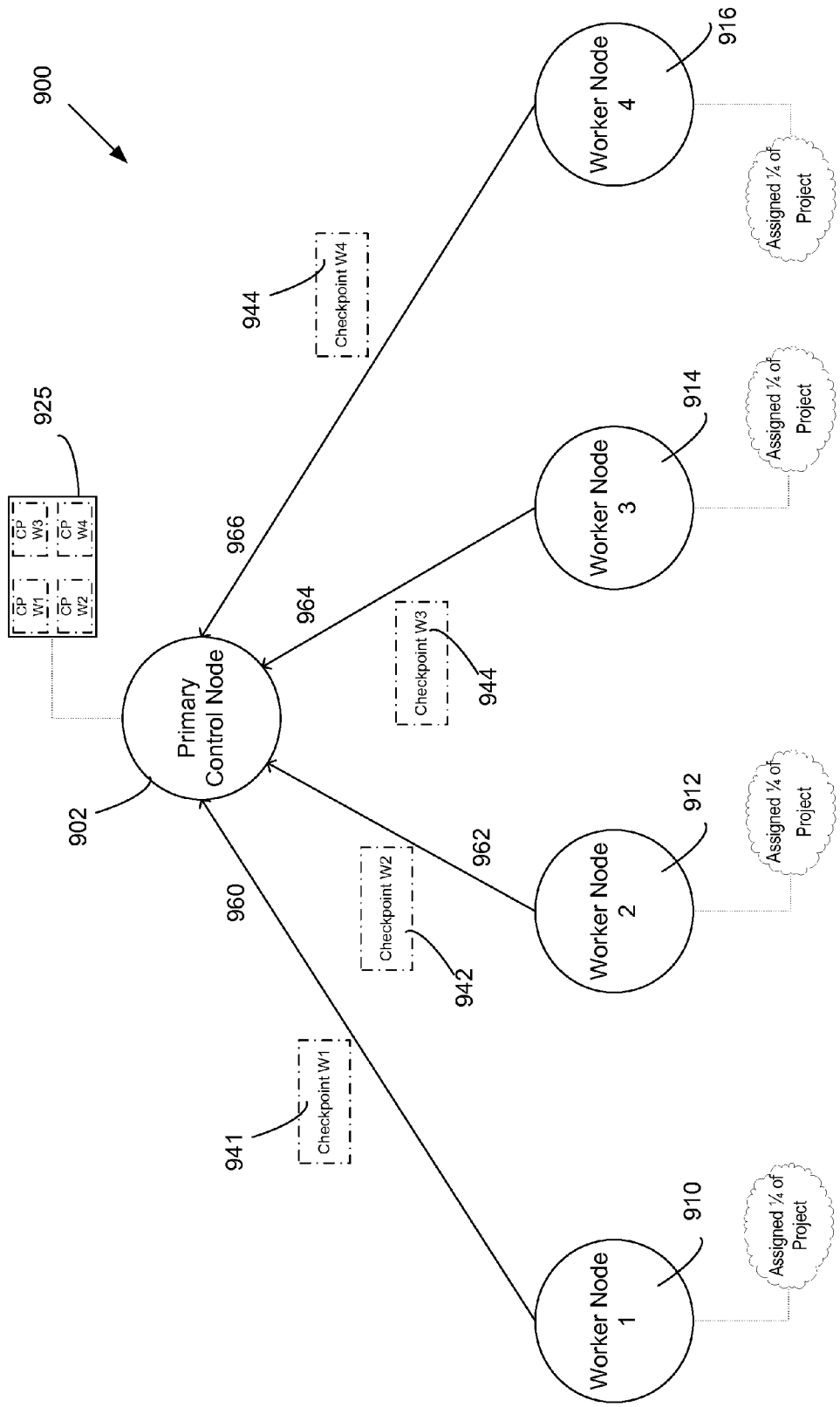
FIG. 9 illustrates an example of a communications grid including a primary control node and one or more worker nodes, according to embodiments of the present technology.

FIG. 9 illustrates a communications grid 900 including a primary control node and one or more worker nodes, according to embodiments of the present technology. Communications grid 900 includes new primary control node 902 and worker nodes 910, 912, 914 and 916. As noted, primary control node 902 may distribute the work within a project being executed to each of the worker nodes within the communications grid such that each worker node performs or executed a portion of the project. For example, as shown in FIG. 9, worker nodes 910, 912, 914 and 916 may each be assigned a one-quarter portion of the project being executed by the communications grid 900 and being controlled by primary control node 902. For example, primary control node 902 may transmit instructions to the worker nodes, for example via communications paths 960, 962, 964 and 966, respectively. Furthermore, the worker nodes may also transmit information primary control node 902. For example, the worker nodes may generate (and, for example, locally store) and transmit checkpoints of their progress within a project, or their assigned portion of a project, to primary control node 902 so that primary control node 902 receives and stores periodic checkpoints or statuses of the progress of each of the worker nodes. The received checkpoints for each worker node may allow primary control node 902 to compile statuses of the progress of the project being executed on the communications grid. The checkpoints may allow primary control node 902 to generate a snapshot of the communications grid, or the checkpoints may be treated as separate, independent data to be used in other capacities by the primary control node. After the checkpoints are received, they may be stored by the primary control node in storage 925. The primary control node 902 may also store any data generated from the checkpoints, including for example a snapshot of the communications grid.

Checkpoints may be generated by a worker node (or a control node) after a stage of the project has been completed (e.g., if the project is a multi-stage operation). Alternatively, checkpoints may be generated after a certain amount or amounts of the project (e.g., a certain percentage) have been completed (e.g., if the project includes a large data set). The method of generating and saving or transmitting checkpoint information may be chosen based on the project and/or situation by the primary control node (or, in other embodiments, by other nodes on the grid or by a user external to the grid).

Figure 10:
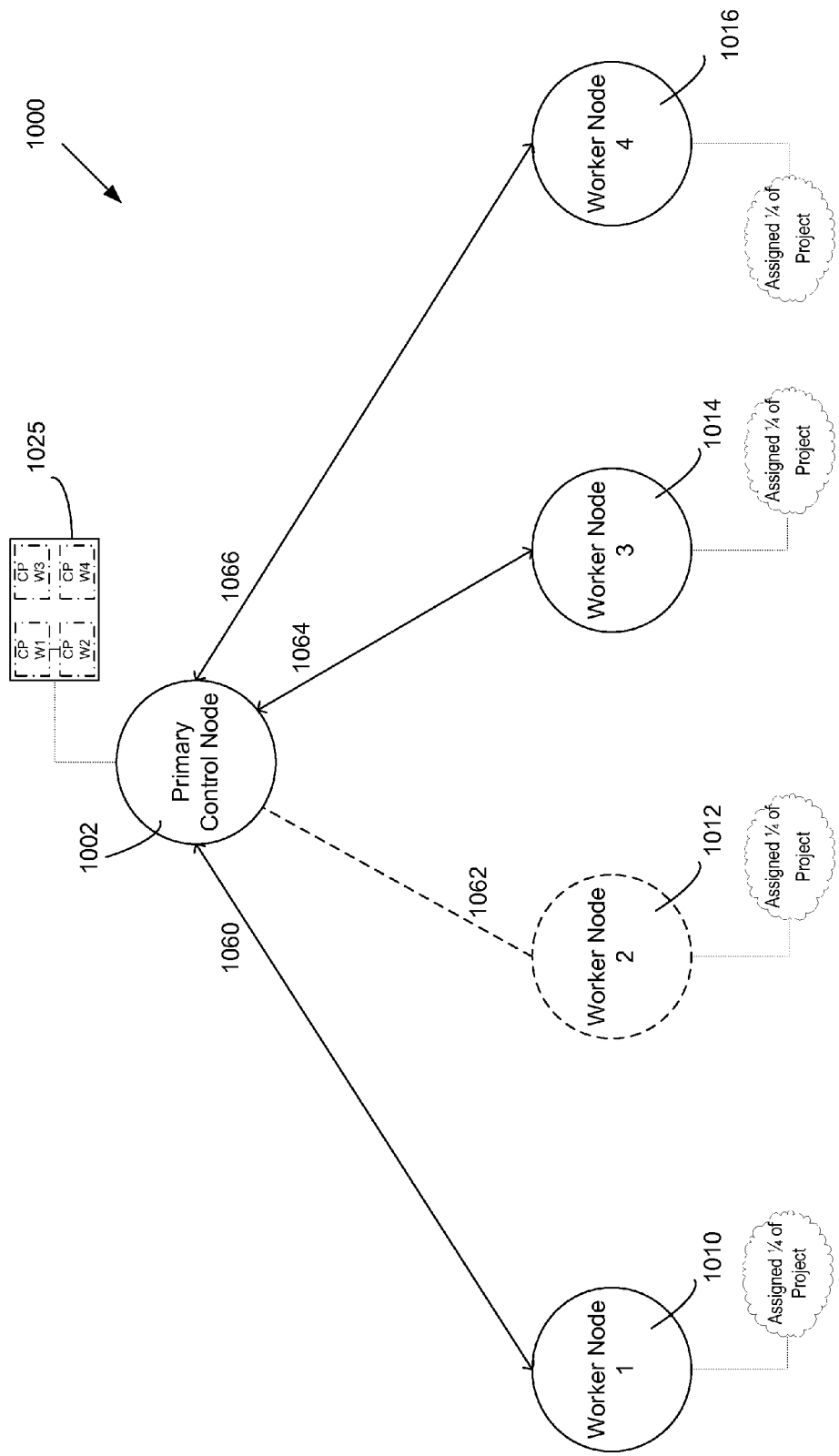
FIG. 10 illustrates an example of a communications grid including a control node and one or more worker nodes, according to embodiments of the present technology.
Figure 11:
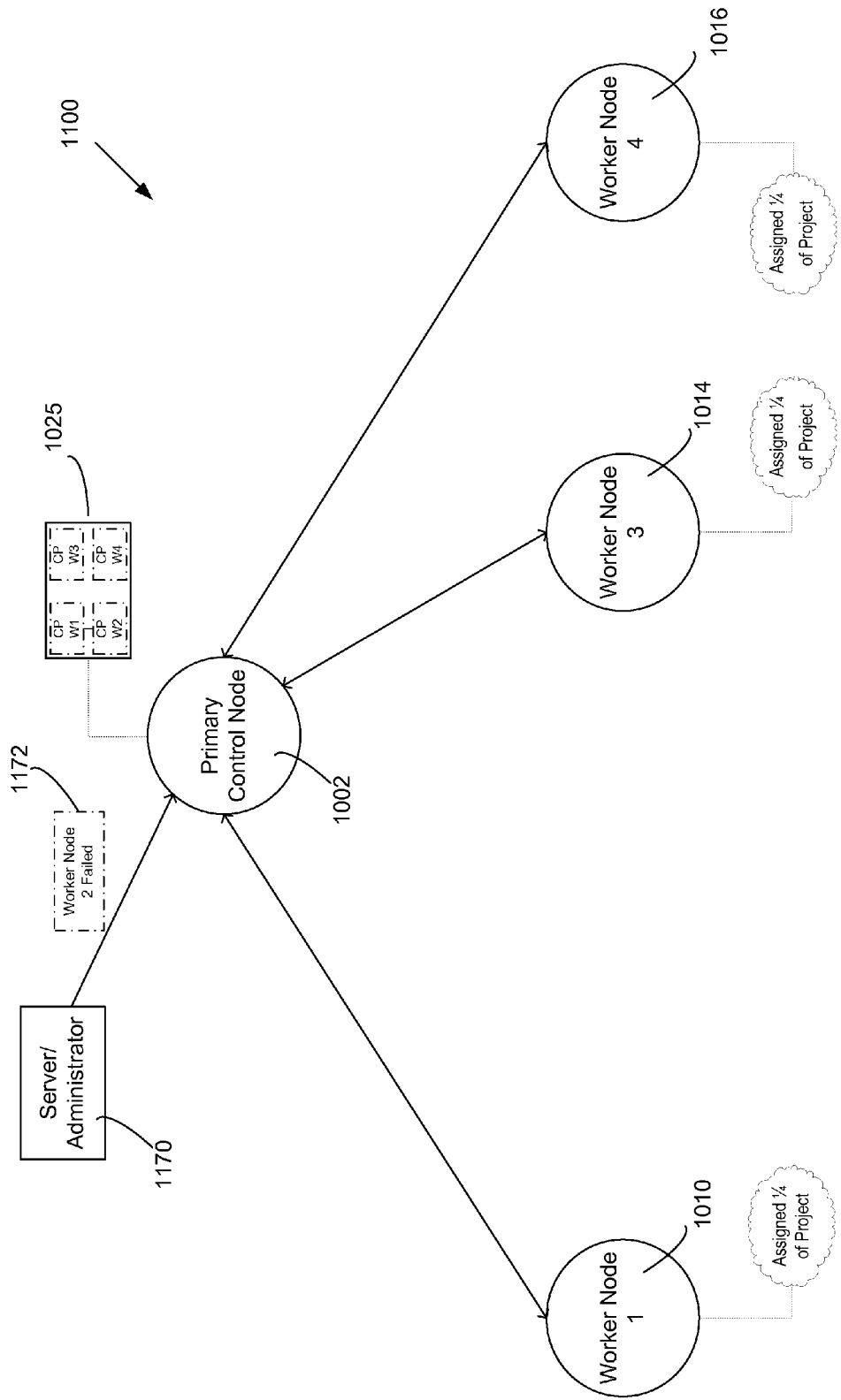
FIG. 11 illustrates an example of a communications grid including a control node and one or more worker nodes, according to embodiments of the present technology.
Figure 12:
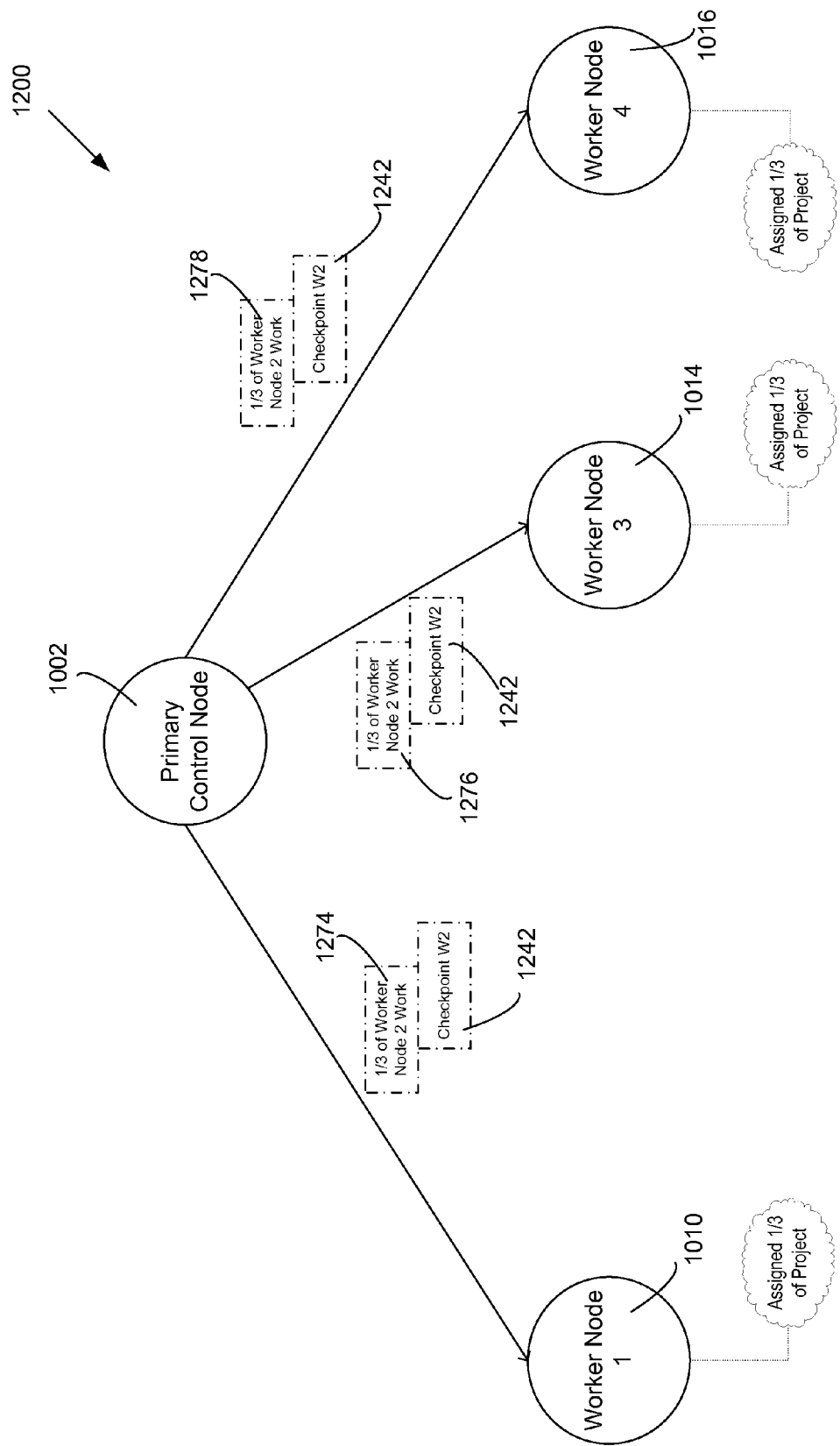
FIG. 12 illustrates an example of a communications grid including a control node and one or more worker nodes, according to embodiments of the present technology.

In some situations, failure can occur at worker nodes. FIGS. 10-12 illustrate a communications grid including a control node and one or more worker nodes, according to embodiments of the present technology. Communications grid 1000 includes primary control node 1002 and worker nodes 1010, 1012, 1014 and 1016. As noted, primary control node 1002 may distribute the work within a project or data set being executed to each of the worker nodes within the communications grid such that each worker node performs or executed a portion of the project. For example, as shown in FIG. 10, worker nodes 1010, 1012, 1014 and 1016 may each be assigned a one-quarter portion of the project being executed by the communications grid 1000 and being controlled by primary control node 1002. The worker nodes may transmit checkpoints of their progress within a project, or their assigned portion of a project, to primary control node 1002 so that primary control node 1002 receives and stores periodic checkpoints or statuses of the progress of each of the worker nodes. Communications grid 1000 also shows that one of the worker nodes, worker node 1012 may fail (indicated by dotted lines in FIG. 10), and therefore that communication paths between the worker node 1012 and other nodes on the communications grid (e.g., path 1062 between primary control node 1002 and worker node 1012) may be severed because of such a failure.

However, communications grid 1000 may account for a failure of a worker node, such as worker node 1012. As noted, worker node 1012 is communicatively connected to primary control node 1002, which may control worker node 1012 and/or the work being performed by worker node 1012. If worker node 1012 fails, then primary control node 1002 may detect that worker node 1012 has failed or may receive a notification that worker node 1012 has failed. For example, primary control node 1002 may be notified that worker node 1012 has failed by another worker node (e.g., worker node 1010, 1014 and/or 1016, which are also communicatively connected to primary control node 1002) or, if one exists, another control node (e.g., a backup control node) on communications grid 1000. Alternatively, primary control node 1002 may be notified by a user (e.g., server or administrator 1170 in FIG. 11 of the grid via communication 1172, as shown within communications grid 1100 in FIG. 11, discussed further herein). Alternative embodiments include using thresholds to determine when, after a predetermined amount of time, it should be established or assumed that a worker node has failed. For example, if a worker node has not transmitted an acknowledgement communication (e.g., ACK) or another expected communication, as noticed by a control node or other node expected to receive such a communication, for a certain amount of time that is greater than a predetermined threshold, it may be assumed that the worker node has failed. Such a determination may allow a control node to redistribute work being performed by a failed worker node to another worker node.

To make up for the loss of worker node 1012 after it fails, or in other words to make up for the work being assigned to worker node 1012, primary control node 1002 may redistribute the work being performed by worker node 1012 to other worker nodes on communications grid 1000. For example, after primary control node 1002 is knows that worker node 1012 has failed, primary control node 1002 may transmit a communication (e.g., message or notification) to each of the other worker nodes (e.g., all or part of the worker nodes still connected to primary control node 1002 and on communications grid 1000) including the portion of the work being redistributed from worker node 1012 that they are assigned to work on. For example, as shown in communications grid 1200 of FIG. 12 (discussed further herein), primary control node 1002 may transmit a communication 1274 to worker node 1010, a communication 1576 to worker node 1014, and a communication 1278 to worker node 1016 including such information. After receiving such a communication, worker nodes 1010, 1014, and 1016 may add the work identified in their received communication to the work that it will perform on the project. For example, if the remaining work from failed worker node 1012 is redistributed equally between worker node 1010, 1014, and 1016, each of worker nodes 1010, 1014, and 1016 may be assigned one-third of the total work remaining for the project after such work has been reassigned. However, other portions or breakdowns of the work are also possible. For example, an alternative may include adding a new worker node to the grid to take on the additional work.

In an alternative embodiment, primary control node 1002 may transmit a communication (e.g., break communicator message) to each of the worker nodes still on communications grid 1000 including a message that each of the worker nodes should purposefully fail also. In other words, the message may include or cause a communication error within each worker node so that each of the worker nodes still on the grid fail. After each of the worker nodes fails, they may each retrieve their most recent saved checkpoint of their status. Each worker node may also retrieve the status or checkpoint of the first failed worker node, worker node 1012. For example, as shown in FIG. 12, primary control node 1002 may transmit the checkpoint 1242 of failed worker node 1012 to worker nodes 1010, 1014 and 1016. This may allow each of the still existing (e.g., non-failed) worker nodes to continue work on the project from their most recent checkpoint at the same time and so they do not miss any of the work to be performed on the project. This may also allow the worker nodes to continue work on the work redistributed from the failed worker node at the point where worker node 1012 failed when performing the work. Using such a checkpoint may allow the worker nodes to be efficient so as to not duplicate work already completed or to not miss work that needs to be completed. Such checkpoints may be stored within each worker node or may be retrieved from another device or source (e.g., another worker node, a control node, a cloud network, or other location). It may be helpful to store checkpoints in devices other than at a backup control node in case, for some reason, the backup control node has not stored the checkpoint, or in case the backup control node fails and a new control node joins the grid at a later time. In such an embodiment, a worker node or other devices or networks that has stored the checkpoint may transmit the checkpoint or other status information to the new control node.

Figure 13:
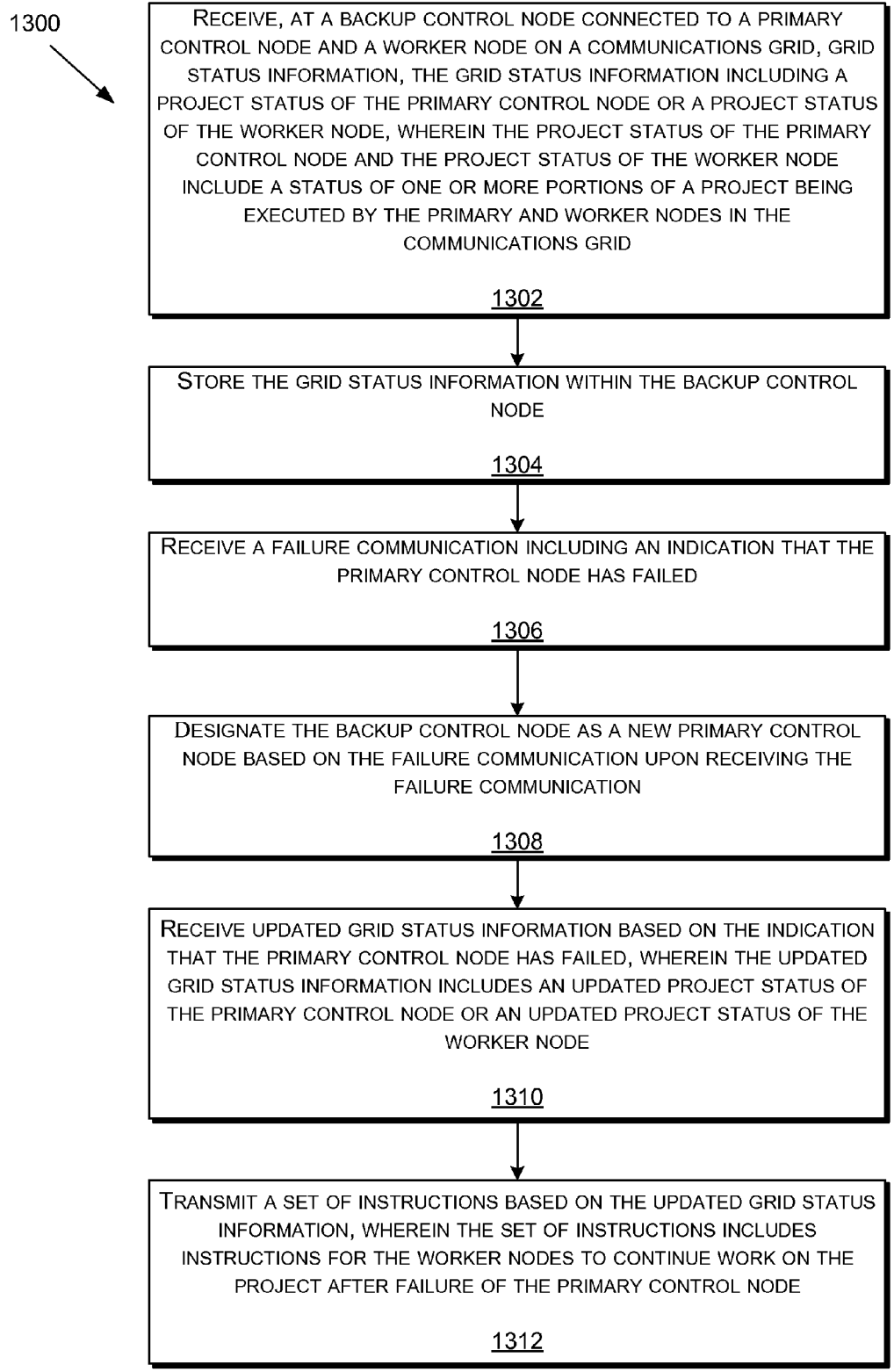
FIG. 13 is a flow chart showing an example process for recovering from a primary control node failure in a communications grid, according to embodiments of the present technology.

FIG. 13 is a flow chart 1300 showing an example process for adjusting a work project in a communications grid after a failure of a control node, according to embodiments of the present technology. The process may include, for example, receiving, at a backup control node connected to a primary control node and a worker node on a communications grid, grid status information, the grid status information including a project status of the primary control node or a project status of the worker node, wherein the project status of the primary control node and the project status of the worker node include a status of one or more portions of a project being executed by the primary and worker nodes in the communications grid (step 1302). The process may also include storing the grid status information within the backup control node (step 1304). The process may also include receiving a failure communication including an indication that the primary control node has failed (step 1306). The process may also include designating the backup control node as a new primary control node based on the failure communication upon receiving the failure communication (step 1308). The process may also include receiving updated grid status information based on the indication that the primary control node has failed, wherein the updated grid status information includes an updated project status of the primary control node or an updated project status of the worker node (step 1310). The process may also include transmitting a set of instructions based on the updated grid status information, wherein the set of instructions includes instructions for the worker nodes to continue work on the project after failure of the primary control node (step 1312).

Figure 14:
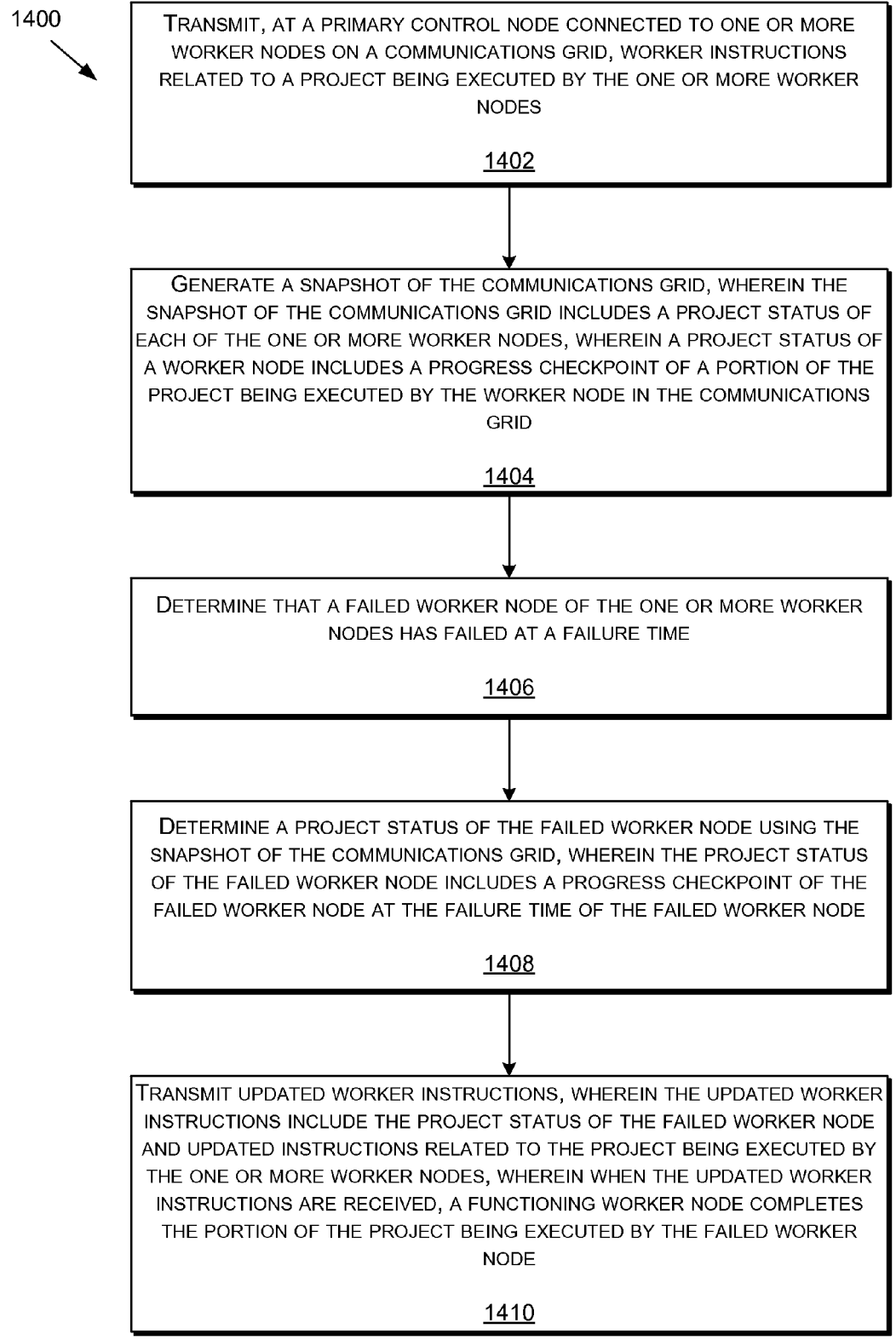
FIG. 14 is a flow chart showing an example process for recovering from a worker node failure in a communications grid after a failure of a worker node, according to embodiments of the present technology.

FIG. 14 is a flow chart 1400 showing an example process for adjusting a work project in a communications grid after a failure of a worker node, according to embodiments of the present technology. The process may include, for example, transmitting, at a primary control node connected to one or more worker nodes on a communications grid, worker instructions related to a project being executed by the one or more worker nodes (step 1402). The process may also include generating a snapshot of the communications grid, wherein the snapshot of the communications grid includes a project status of each of the one or more worker nodes, wherein a project status of a worker node includes a project checkpoint of a portion of the project being executed by the worker node in the communications grid (step 1404). The process may also include determining that a failed worker node of the one or more worker nodes has failed at a failure time (step 1406). The process may also include determining a project status of the failed worker node using the snapshot of the communications grid, wherein the project status of the failed worker node includes a project checkpoint of the failed worker node at the failure time of the failed worker node (step 1408). The process may also include transmitting updated worker instructions, wherein the updated worker instructions include the project status of the failed worker node and updated instructions related to the project being executed by the one or more worker nodes, wherein when the updated worker instructions are received, a functioning worker node completes the portion of the project being executed by the failed worker node (step 1410).

Figure 15:
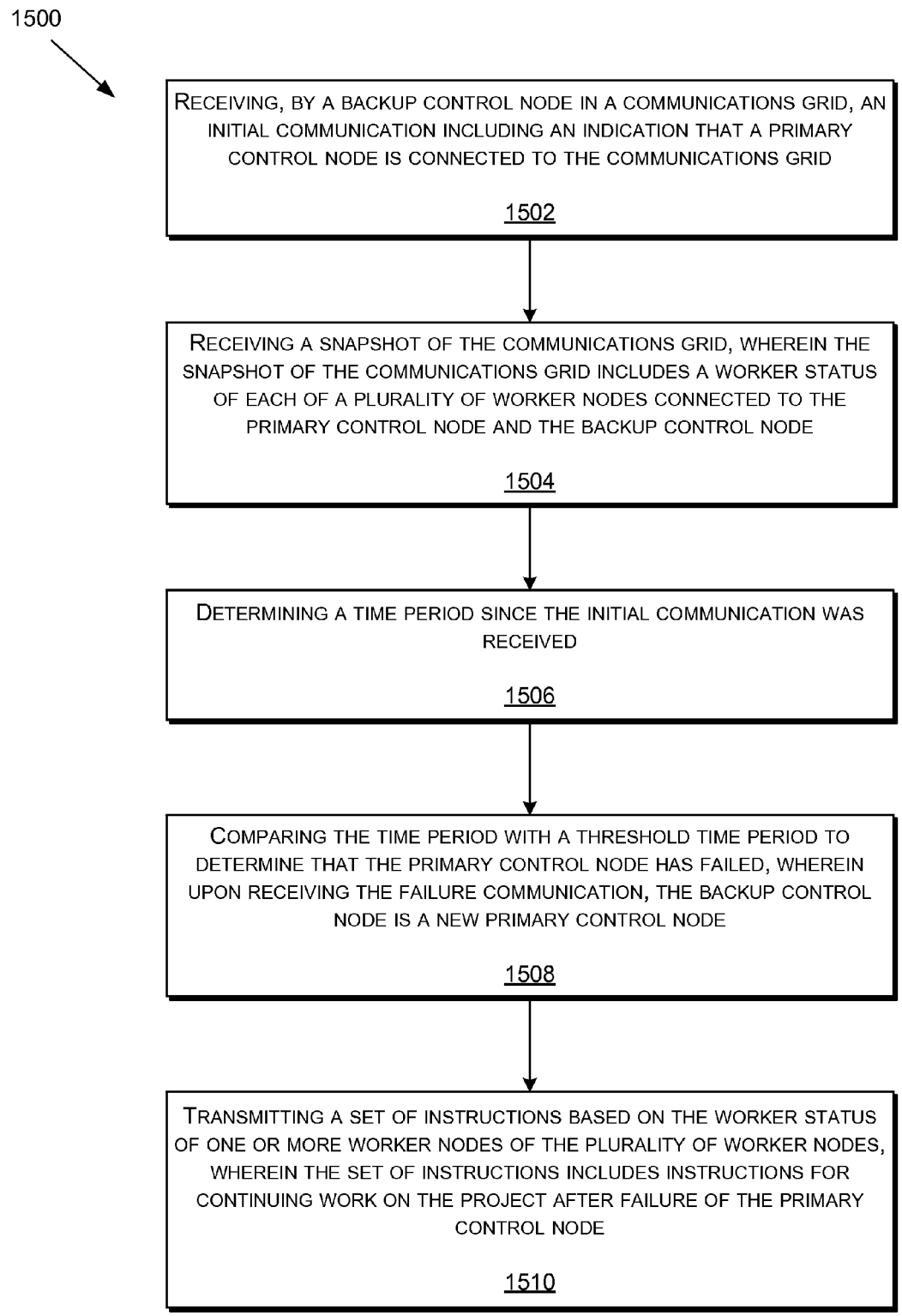
FIG. 15 is a flow chart showing an example process for recovering from a control node failure in a communications grid, according to embodiments of the present technology.

FIG. 15 is a flow chart 1500 showing an example process for adjusting a work project in a communications grid after a failure of a control node, according to embodiments of the present technology. The process may include, for example, receiving, by a backup control node in a communications grid, an initial communication including an indication that a primary control node is connected to the communications grid (step 1502). The process may also include receiving a snapshot of the communications grid, wherein the snapshot of the communications grid includes a worker status of each of a plurality of worker nodes connected to the primary control node and the backup control node (step 1504). The process may also include determining a time period since the initial communication was received (step 1506). The process may also include comparing the time period with a threshold time period to determine that the primary control node has failed, wherein upon receiving the failure communication, the backup control node is a new primary control node (step 1508). The process may also include transmitting a set of instructions based on the worker status of one or more worker nodes of the plurality of worker nodes, wherein the set of instructions includes instructions for continuing work on the project after failure of the primary control node (step 1510).

Figure 16:
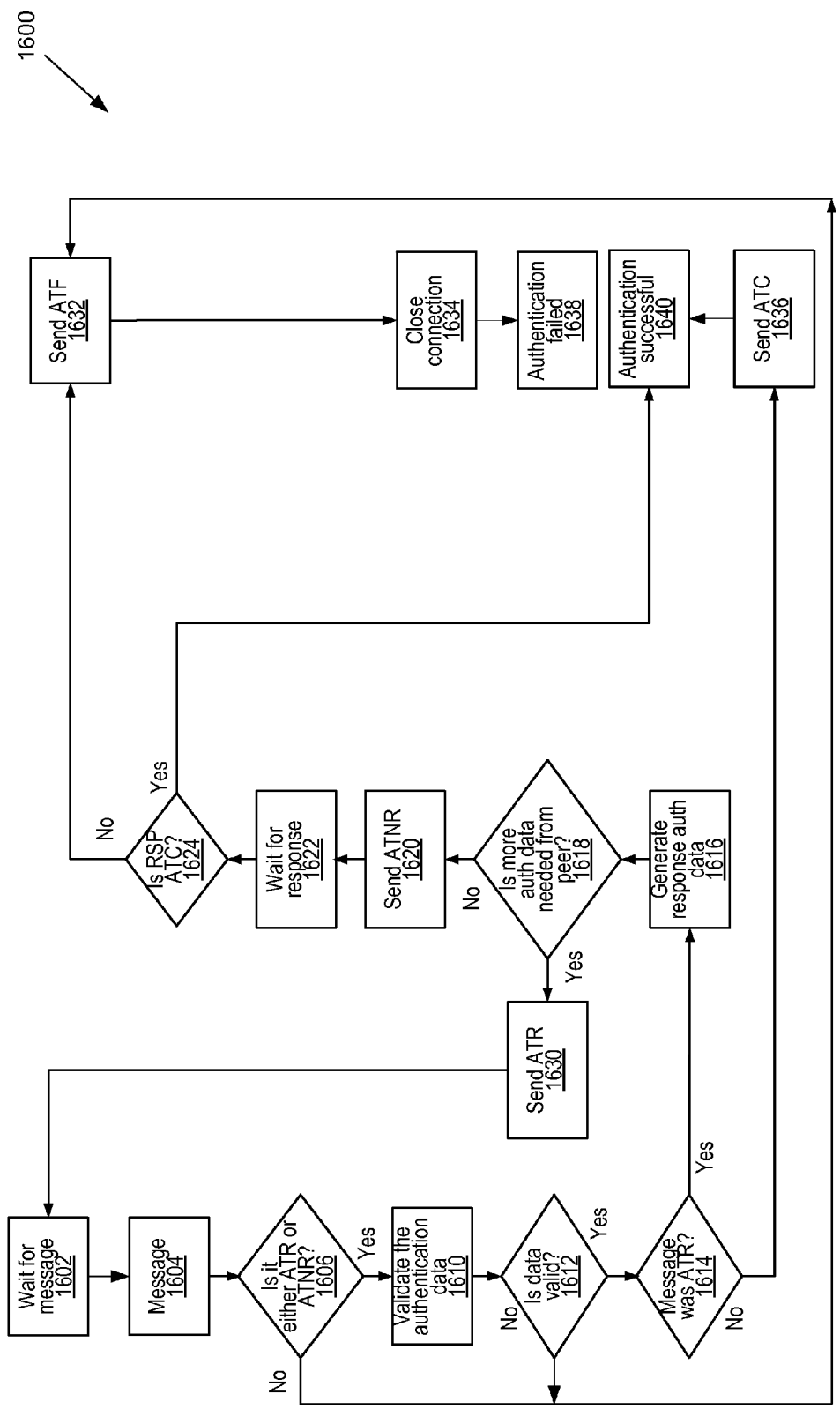
FIG. 16 is a flow chart showing an example process for authenticating a connection between nodes from the perspective of a grid server, according to embodiments of the present technology.

FIG. 16 is a flow chart 1600 showing an example process for authenticating a connection between nodes from the perspective of a grid server (e.g., from an established node on a grid), according to embodiments of the present technology. As noted, when a control node (e.g., primary control node) receives a connection from another control node, it may first check to see if the peer node is in a stored list of configured nodes in the grid. If it is not on the list, it may clear (i.e. refuse) the connection. If it is on the list, it may then attempt to authenticate the connection so as to make sure that the new node belongs on the grid. Authentication may be shown through the exchange of different types of messages that allow for either one-way or two-way authentication. For example, the different types of messages may include:

MSG_AUTH_TOKEN_RSP ("ATR"). This message may mean that a block of authentication data is being sent, and the reply should to include a block of data. The message may include an algorithm identifier. The expected response may be MSG_AUTH_TOKEN_RSP, MSG_AUTH_TOKEN_NO_RSP or MSG_AUTH_FAILED.

MSG_AUTH_TOKEN_NO_RSP ("ATNR"). This message may mean that a block of authentication data is provided, and no further authentication data is needed in response. The message may include an algorithm identifier. An example ATNR message may include a username and/or password, or other types of messages.

MSG_AUTH_COMPLETE ("ATC"). This message may include an indication that authentication has completed successfully.

MSG_AUTH_FAILED ("ATF"). This message may indicate that authentication failed. The message may include a diagnostic failure code.

As shown in FIG. 16, an authenticating node may wait for a message (block 1602) and receive a message (block 1604). When the message is received, the node may determine if the message is either an ATR or ATNR message (block 1606). If the message is neither an ATR or ATNR message, then the node may transmit an ATF message and process may end. If the message is determined to be an ATR or ATNR message, then the authenticating node may, at 1610 and 1612, validate the data received. If the data is valid, and the message was an ATR (as determined at block 1614), then the node may generate a response to the ATR at block 1616 because the ATR message requires a response. Then, the node may determine if more authentication data is needed at block 1618, and sends an ATR at 1630 if so. If not, then the node may transmit an ATNR at 1620 and wait for a response at 1622. At 1624, the node may determine if the received response (at block 1622) is an ATC. If so, the authentication was successful as shown in block 1640. If not, it may send an ATF in response at block 1632 (because authentication failed, as shown in blocks 1634 and 1638).

Figure 17:
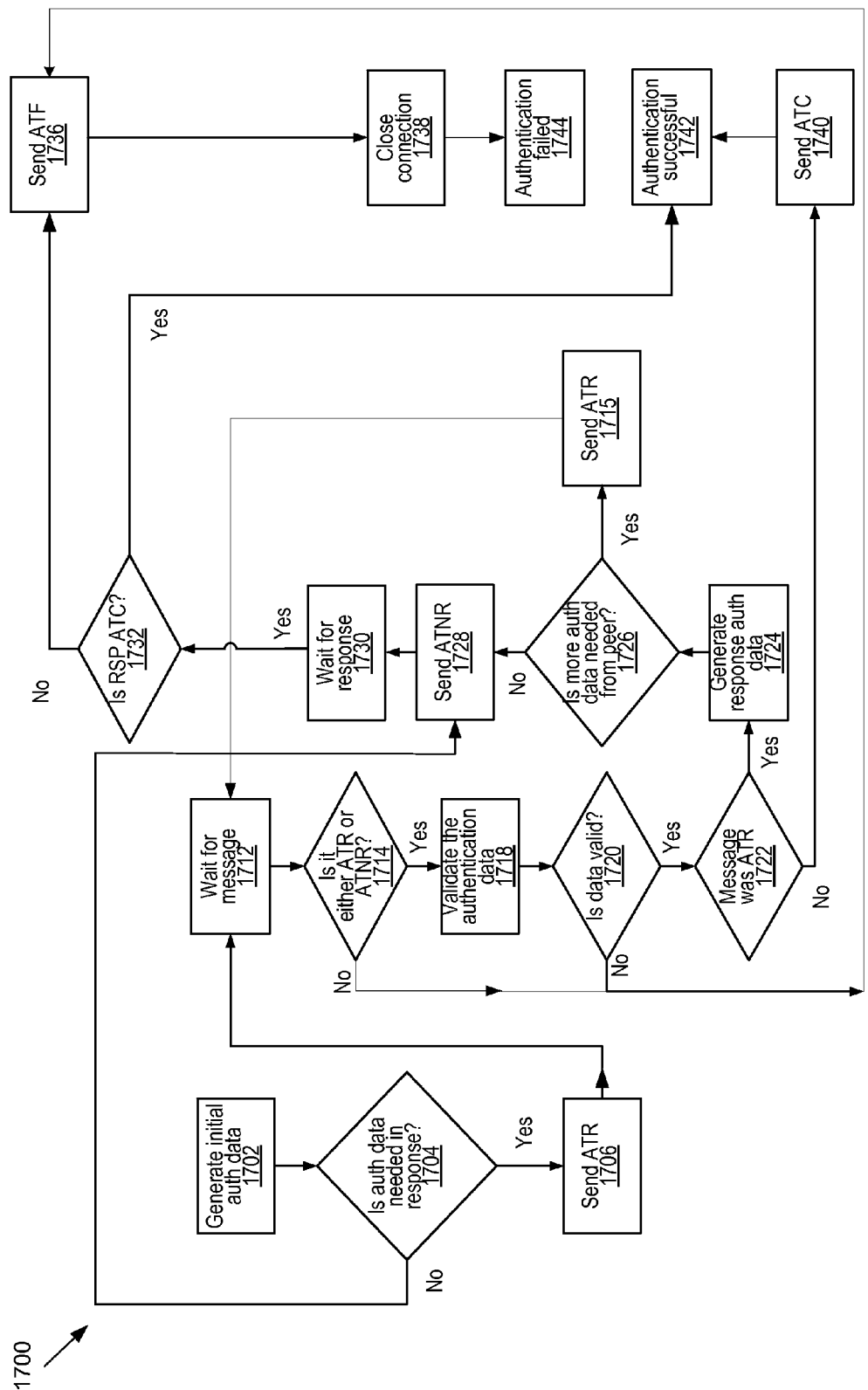
FIG. 17 is a flow chart showing an example process for authenticating a connection between nodes from the perspective of a grid client, according to embodiments of the present technology.

FIG. 17 is a flow chart 1700 showing an example process for authenticating a connection between nodes from the perspective of a grid client (e.g., from a new node on a grid), according to embodiments of the present technology. The flow chart 1700 shown in FIG. 17 is very similar to flow chart 1600 shown in FIG. 16, except flow chart 1700 includes blocks 1702, 1704, 1706 and 1708 to determine if authentication data will be needed in response. In block 1702, the node may generate initial authentication data and then, at block 1704, determine if authentication data is needed in response. If so, it may transmit an ATR at 1706 to require authentication data in response. If not, it may transmit an ATNR at 1728.

As noted, if authentication data is needed in response, an authenticating node may wait for a message (block 1712) and receive a message. When the message is received, the node may determine if the message is either an ATR or ATNR message (block 1714). If the message is neither an ATR or ATNR message, then the node may transmit an ATF message (block 1736) and process may end because the process failed (as shown in nodes 1738 and 1740). If the message is determined to be an ATR or ATNR message, then the authenticating node may, at 1718 and 1720, validate the data received. If the data is valid, and the message was an ATR (as determined at block 1722), then the node may generate a response to the ATR at block 1724 because the ATR message requires a response. Then, the node may determine if more authentication data is needed at block 1726, and sends an ATR at 1715 if so. If not, then the node may transmit an ATNR at 1728 and wait for a response at 1730. At 1732, the node may determine if the received response is an ATC. If so, the authentication was successful as shown in block 1742. If not, it may send an ATF in response at block 1636. Referring back to node 1722, if the message is determined to not be an ATR, then an ATC message may be sent (at node 1740) because the authentication was successful (as shown in FIG. 1742).

Figure 18:
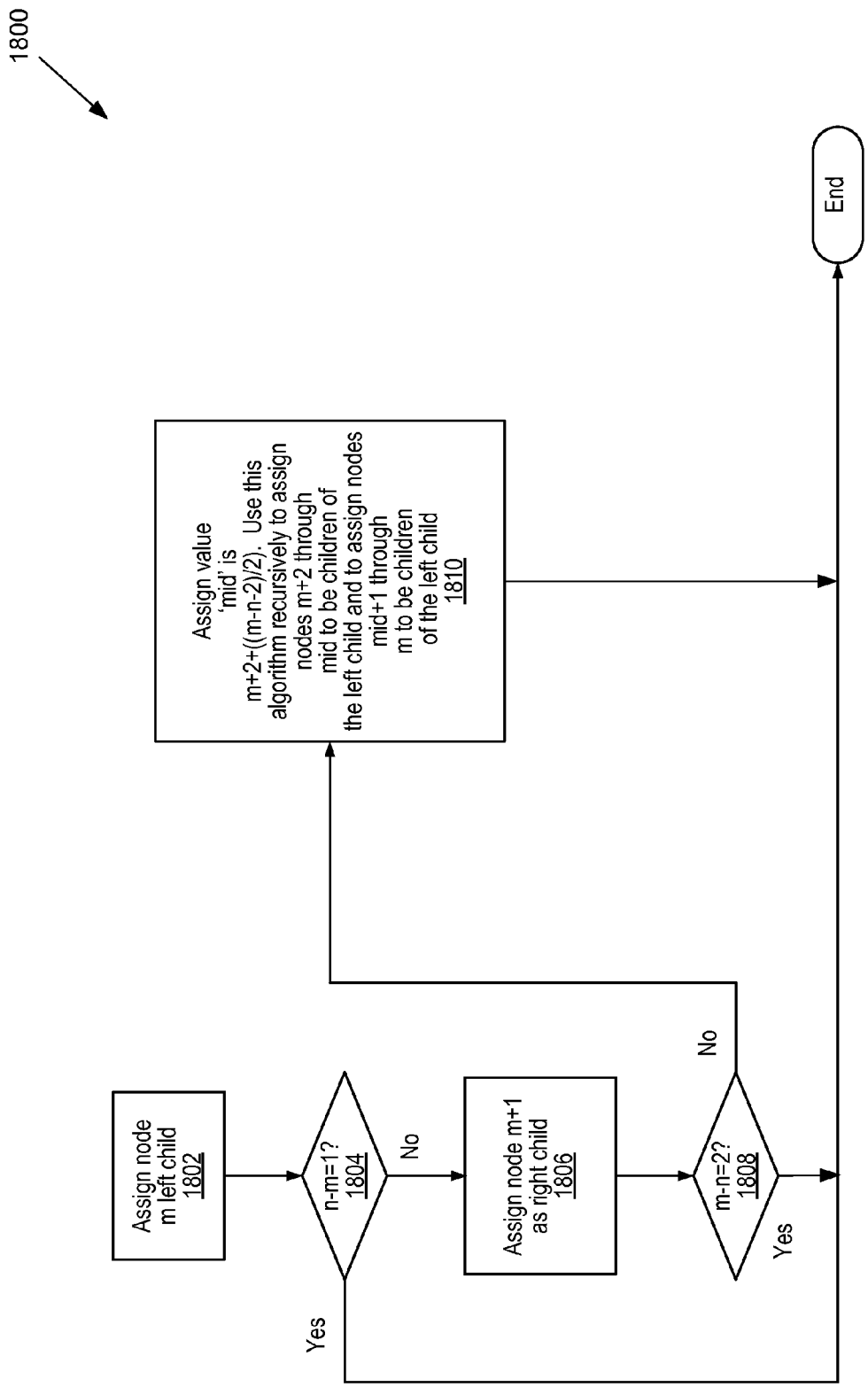
FIG. 18 is a flow chart showing an example process to assign a list of nodes, numbered m through n, as children to a node, such as a control node, according to embodiments of the present technology.

FIG. 18 is a flow chart 1800 showing an example process to assign a list of nodes (numbered m through n) as children to a node, such as a control node, according to embodiments of the present technology. At block 1802, node m may be assigned a as a left child (e.g., worker) node. Then, to check to see if other child nodes exist, it may be determined at block 1804 if n−m=1, or in other words whether the last child assigned (m) is less than or equal to the total number of children (n). If so, the process may end. If not, node m+1 may be assigned as a right child at block 1806. The process of checking to see if other children exist is reproduced in block 1808 by checking to see if m−n=2. If so, then the process may end. If not, then the algorithm m+2+((m−n−2)/2) may be used to determine the "mid" children values at block 1810. The algorithm can be used recursively to assign nodes m+2 through mid to be children of the left child and to assign nodes mid+1 through n to be children of the left child. After "mid" is computed, the algorithm may be called two more times. The first time that it is called, it may be called where new_m=old m+2 and new_n=mid. The second time that it is called, it may be called where new_m=mid+1 and new_n=old_n.

Figure 19:
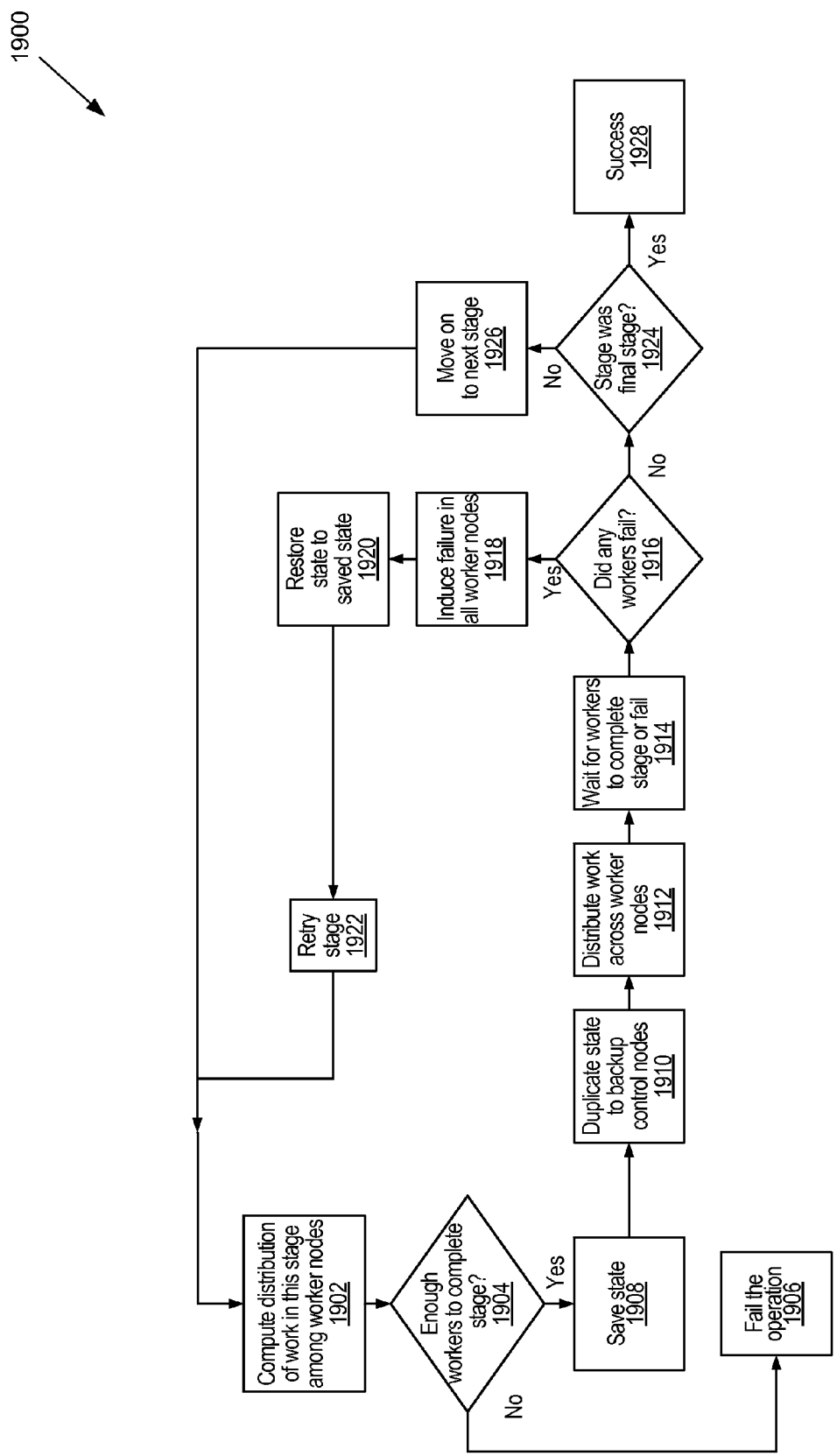
FIG. 19 is a flow chart showing an example process for a primary control node to distribute work for a client project between the other nodes in a communications grid, according to embodiments of the present technology.

FIG. 19 is a flow chart 1900 showing an example process for a primary control node to distribute work for a client project between the other nodes in a communications grid, according to embodiments of the present technology. In block 1902, the primary control node determines how to distribute the work to the worker nodes (and if such distribution is possible). For example, this step may take place after worker nodes have been assigned and authenticated on the grid, as described in FIGS. 16-18. The primary control node may then determine, at block 1904, if the grid includes enough worker nodes to complete the stage of the work. If not, the operation or stage may be determined to have failed at block 1906. If so, the primary control node may save the state at block 1908 and transmit grid snapshot or state information to the backup control nodes at block 1910. The primary control node may then distribute work (from a certain stage of the work, if the work is in stages) across the worker nodes at block 1912, and wait for the worker nodes to complete the stage or fail at block 1914. It may then be determined if any workers failed at block 1916. If one or more workers failed, then one of several processes may take place to remedy the failure. For example, the primary control node may redistribute work among the rest of the worker nodes. In another example, the primary control node may induce failure of all worker nodes (e.g., at block 1918) so that each worker node may restart their work at a recent snapshot of the grid's work on the project. For example, the worker nodes may then restore their work on the state to a saved state (e.g., using a saved snapshot) at block 1920, and then retry the work on the stage (on which the failed worker node failed) at block 1922. Referring back to block 1916, if no workers failed, then the primary control node may consider at block 1924 whether the stage was the final stage of the project. If so, the primary control node may report a successful completion at block 1928. If not, then the primary control node may assign work to the worker nodes for the next stage in the project at block 1926.

Figure 20:
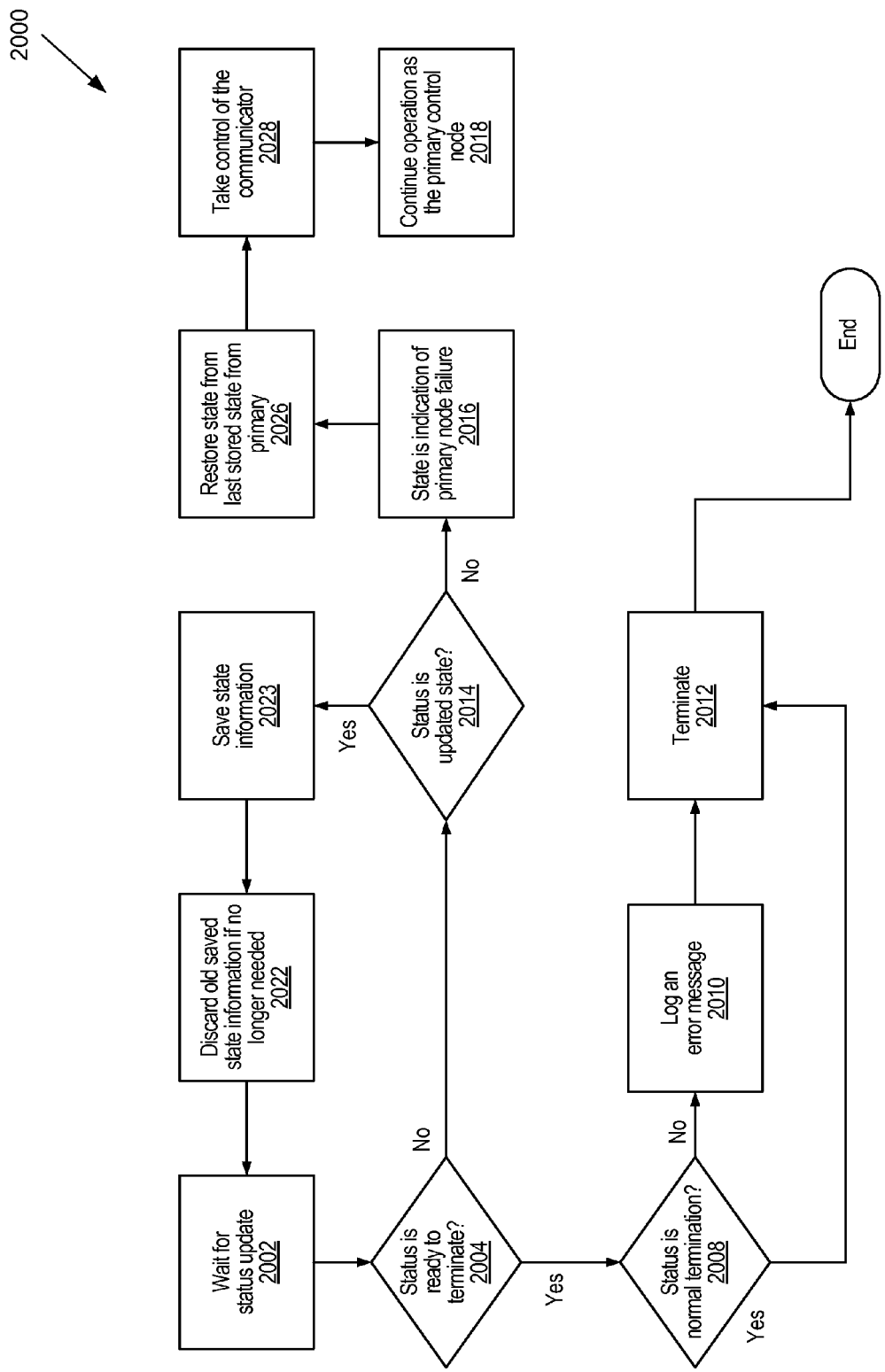
FIG. 20 is a flow chart showing an example process for a backup control node to receive and store updated status information in a communications grid, according to embodiments of the present technology.

FIG. 20 is a flow chart 2000 showing an example process for a backup control node to receive and store updated status information in a communications grid, according to embodiments of the present technology. As noted herein, a communications grid may have one, two, three, or more control nodes. FIG. 20 may only apply to a communications grid that includes more than one control node. At step 2002, the backup control node may wait for a status update to be transmitted by the primary control node. In blocks 2004, 2014, 2023 and 2022, the status or grid snapshot may be updated. For example, if the status has a predetermined time after which the status may expire or terminate (determined, for example, at block 2004), and that time has been reached, then it may be determined if the status is an updated status (e.g., if the backup control node received updated status information, for example in the form of a grid snapshot) at block 2014. If so, then the state information may be saved at block 2023, old or expired status information may be discarded if no longer needed, and the backup control node may wait for another status update (e.g., from the primary control node). If the status is ready to terminate at block 2004, then the status may terminate in blocks 2008, 2010 and 2012. If the status is a normal (e.g., scheduled) termination (as determined at block 2008), then the process may terminate at block 1212. If not, then the backup control node may log an error message at block 2010 and then terminate at block 2012. Referring back to block 2014, if the status does not include an updated state, then the backup control node may determine that the primary control node has failed at block 2016. At block 2026, the latest stored state may be restored (e.g., from the primary control node) at block 2026, and the backup control node may take over as primary control node at blocks 2028 and 2018.

Figure 21:
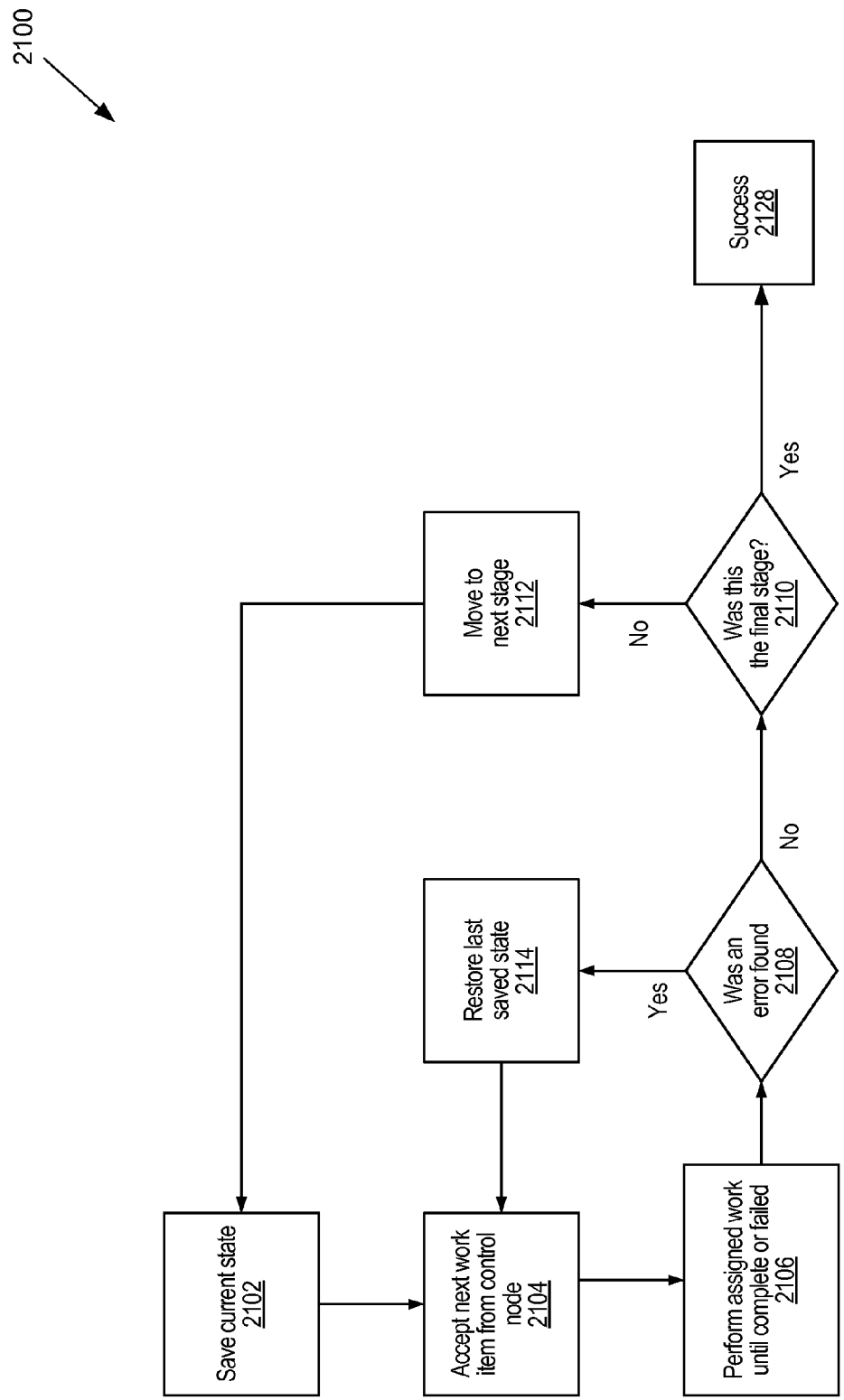
FIG. 21 is a flow chart showing an example method for a worker node to process a job during a communications grid computation, according to embodiments of the present technology.

FIG. 21 is a flow chart 2100 showing an example process for a worker node during a communications grid computation, according to embodiments of the present technology. At step 2104, a worker node may accept work as assigned from a control node, and may perform the assigned work until it has completed the work or until the worker node has failed (at block 2106), as determined at block 2108. If the worker node failed, then it may restore its last saved state (e.g., using a previously stored state or snapshot) at block 2114 and accept a next work item from the control node (e.g., back to block 2104). If the worker node didn't fail, and no error was found, then the worker node may determine if the completed state was the final stage of the project at block 2110. If so, then the worker node may report a success at block 2128 and terminate the process. If it was not the final stage, then the worker node may move to the next stage in its assigned work at block 2112. Before any stage is begun by a worker node, it may save its current state (e.g., at block 2104) so that the worker node will have its previous (and recent) state stored in case the worker node fails. The worker node may transmit its state at any time that it is requested to do so by, for example, a control node and the state may be incorporated as part of a grid snapshot.

Figure 22:
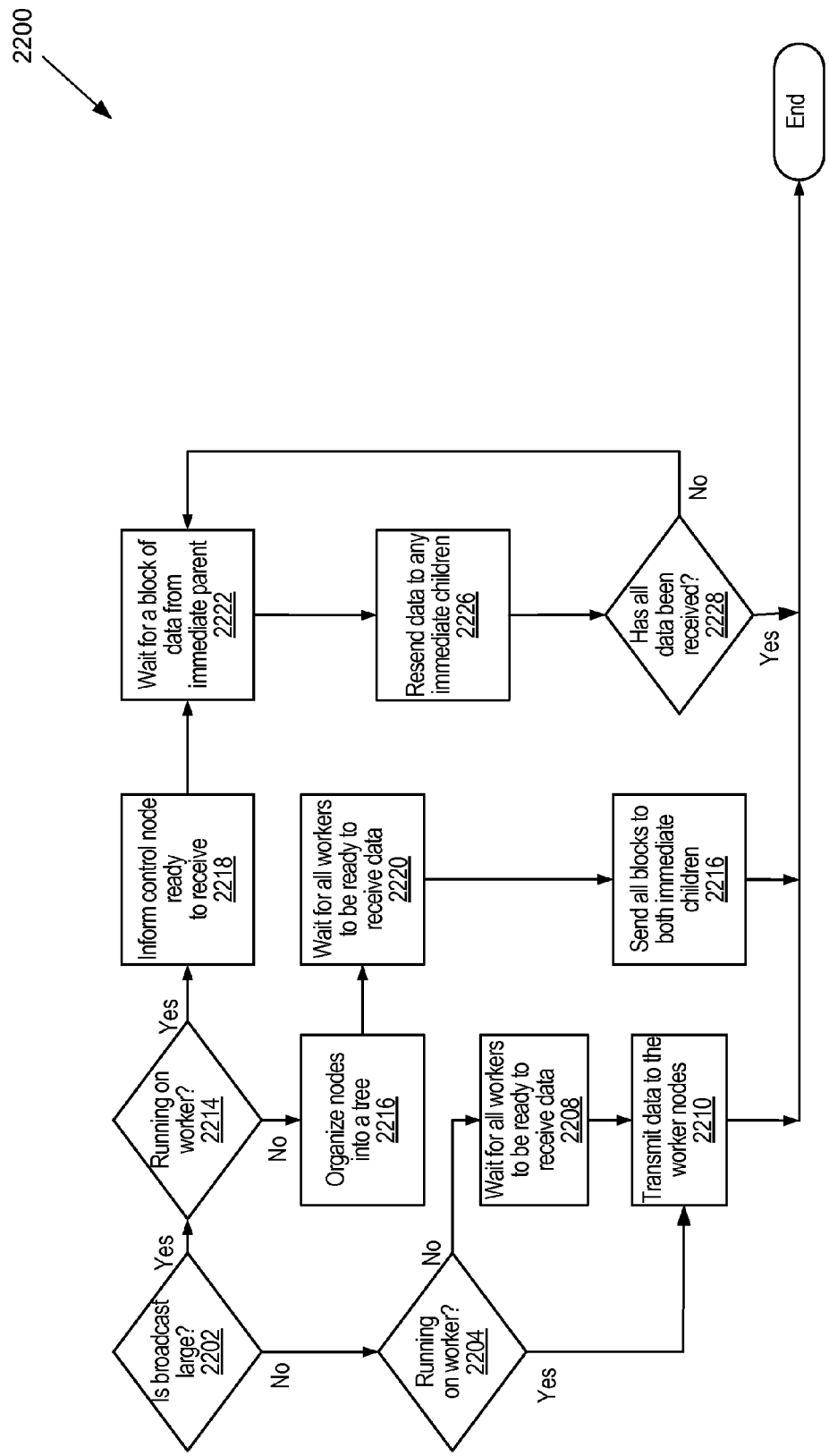
FIG. 22 is a flow chart showing an example process for broadcasting data within a communications grid, according to embodiments of the present technology.

FIG. 22 is a flow chart 2200 showing an example process for broadcasting data within a communications grid, according to embodiments of the present technology. In block 2202, a node may determine if the data that it would like to broadcast to the rest of the nodes in the grid is large (e.g., greater than 64 KB). If the data is determined to not be large, then the node may determine if the data is running on worker nodes (e.g., not running on a control node) in block 2204. If no, then the node may, at block 2208, wait for all worker nodes to be ready to received data and, at block 2210, transmit the data to each worker node that it would like to run the data. If yes, then the node may transmit data to the worker nodes at block 2210. Referring back to block 2202, if the broadcast of data is determined to be large, then the node may determine if the data is running on worker nodes in block 2214. If not, then the node may organize the other nodes into a tree (e.g., using the algorithm shown in FIG. 21) at block 2216. Then, the node may wait for all workers to be ready to receive data at block 2220 (similar to block 2208), and then send the data to its immediate worker children nodes at block 2216. Referring back to block 2214, if it is determined that the data is running on worker nodes, then the node may inform the control node that the worker nodes are yet ready to receive the data (at block 2218). Then, the node may wait for a block of data from its immediate parent (e.g., a control node) at block 2222, copy data to an output buffer at block 2224, and resend data to any of its immediate worker children nodes at block 2226. Then, it may be determined if all data has been received by the worker nodes at block 2228. If so, then the process may end. If not, then it may revert back to block 2222 and wait, again, for a block of data from its immediate parent node.

Figure 23:
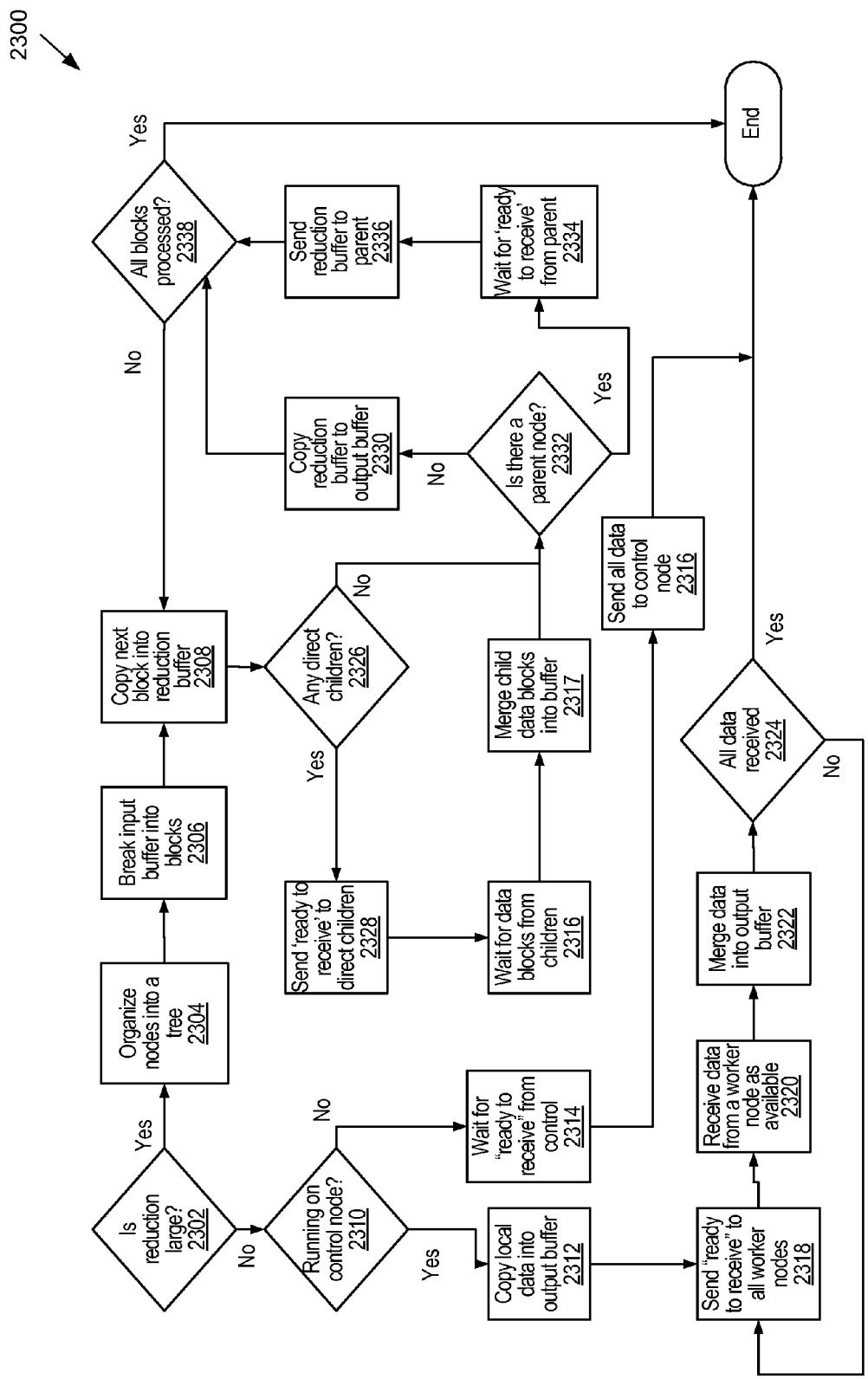
FIG. 23 is a flow chart showing an example process for reduction within a communications grid, according to embodiments of the present technology.

FIG. 23 is a flow chart 2300 showing an example process for a reduction algorithm within a communications grid, according to embodiments of the present technology. In other words, flow chart 2300 shows a process for obtaining input data from several or every node in a communications grid, and performing an operation to obtain a single result block based on that data. As described herein, embodiments of the present technology restrict reduction operations so that it is required that the block of data be the same size on every node, and that the operation not depend on the order of operations. A reduction operation can be performed on a single object on each node, or on a list of objects on each node. Common reduction operations may include: multiply (e.g., find the product of all of the values on all of the nodes), sum (e.g., find the sum of all of the values on all of the nodes), minimum (e.g., find the smallest value on all of the nodes), and maximum (e.g., find the largest value on all of the nodes), among others.

Flow chart 2300 may begin with a determination of whether the reduction is large (block 2302). If so, the grid may organize the nodes into a tree (block 2304), break input buffer into blocks (block 2306), and copy the next block into the reduction buffer (block 2308). For example, a node may include three buffers: (1) an input buffer, which may contain data originating from the local machine; (2) an output buffer, present on the control node; and (3) a "reduction buffer," which may be a temporary buffer on each node that can be used to compute a partial result for itself and all child nodes connected to it. The output buffer may be the same size as the input buffer (although larger than the reduction buffer), and the output buffer may represent the result of the reduction operation across all nodes in the grid. In step 2306, the input buffer may be subdivided into blocks, so that each block is small enough to fit into the reduction buffer. In an example embodiment, if the input and output buffers each contain a million double precision numbers to be reduced with an addition operation, the reduction buffer may be large enough to contain 5,000 double precision numbers. In that example, the input buffer may be split up into 200 blocks of 5,000 double precision numbers each.

Each time step 2308 is reached, a single block of data may be copied out of the input buffer and into the reduction buffer. The grid may then determine whether the block has any direct children (block 2326). If no, then the grid may check to see if the block has a parent node (block 2332). If yes, the grid may then send a "ready to receive" signal to the direct children (block 2328), wait for data blocks to be sent from the children (block 2316), and merge the child data blocks into the buffer (block 2317), for example the reduction buffer. Then, the grid may check to see if the block has a parent node (block 2332). If no, then the grid may copy the reduction buffer to the output buffer (block 2330). For example, since the contents of the reduction buffer may contain the result for a subset of the data, that result may then be copied into the correct portion of the output buffer. If any more blocks of data from the input buffer still need to be processed (step 2338), execution may continue with step 2308. Referring back to block 2332, if the block does have a parent node, then the grid may then wait for a "ready to receive" signal from the parent (block 2328) and send a reduction buffer to the parent (block 2336). For example, the reduction buffer may contain the result of the reduction operation for a single block of data for the subtree of the grid rooted at the current node. When the parent node is ready to receive more information, the contents of the current node's reduction buffer may be forwarded to its parent node, so that its parent node can continue the operation. The grid may then check to see if all blocks have been processed at block 2338. If not, then the flow chart reverts back to block 2308 to copy the next block into the reduction buffer. If so, then the process moves to block 2338 to determine if all blocks have been processed.

Referring back to block 2302, if the reduction is determined to not be large, the grid may determine if it is running on a control node at block 2310. If not, the grid may wait for a "ready to receive" signal from the control node (block 2314), send all data to the control node (block 2316), and end the process. If so, then the grid may copy local data into an output buffer (block 2312), and send a "ready to receive" signal to all worker nodes (block 2318), receive data from a worker node as available (block 2320), and merge the data into an output buffer (block 2322). At block 2324, the grid determines if all data has been received. If not, then the process reverts back to block 2318. If so, then the process ends.

An example set of operations available at a communicator handle of a node (e.g., a control node) are described as follows.

send_state_to_backups: available to the primary control node. This will send a block of state data to every backup control node. This will allow the primary control node to establish a last known state in the backup control nodes that can be used upon failure of the primary node. This call will block until every backup control node has received the information. If there are no backup control nodes, this call does nothing.

get_state_from_primary: available to backup control nodes. This will receive status information. Status will take one of 4 forms: a) Ready for normal termination b) Ready for abnormal termination c) primary control node has failed, and this control node has been selected to act as the new primary. d) Primary control node state information. The fourth form will include a block of state data from the primary control node. This block should be used in the event that the backup takes over as the primary. This call will also return specific status if it is ever selected as the new primary node.

takeover_communicator: available only to backup control nodes. This will cause the backup control node to assume the role of the primary control node in a communicator.

send: sends a block of data to a single specified peer node recv: receives a block of data from a single specified peer node find_data: finds a peer node from which data is available to receive. Optionally waits for data to become available.

broadcast: distributes a block of data from a single node, to every other node in the grid. Broadcast operations can be either simple or tree based. For small blocks of data, the control node sends the entire block of data to each worker node. For larger blocks of data, the nodes are organized in a tree, where each node relays data to at most two other nodes. The tree may generated using the algorithm in FIG. 21. The broadcast may performed using the algorithm or process described in FIG. 22.

reduce: accepts a vector of typed data on every node in the grid. A specific operation is performed on each element of the array from every node. The resulting array of data is sent to a single node. The tree may generated using the algorithm in FIG. 21. The broadcast may performed using the algorithm or process described in FIG. 23.

reduce_all: same operation as reduce, except that the resulting array is available on every node in the grid.

barrier: blocks until every node in the grid calls barrier.

list_broken_nodes: finds a list of nodes in the communicator that have failed on_failure: installs a callback function that will be called every time a communications API fails. This can simplify error handling by having a single function that processes all failures.

on_node_failure: installs a callback function that will be called when any peer node in the grid has failed. This can allow a centralized location for processing the loss of a peer node in a timely manner, even when a communications API has not failed.

root_rank: finds the rank of the current primary control node num_ranks: find the number of nodes participating in the communicator—(not including the backup control nodes)

close: discontinues participation in the communicator. Any other nodes will see this node as broken.

break_communicator: causes every node in the grid to encounter communications failures. This can be used to force the error recovery path in every node.

duplicate_communicator: creates a new communicator based upon an existing communicator. The nodes in the new communicator may include every node in the current communicator, or a subset of those nodes.

In some examples described herein, the systems and methods may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to or from a device.

Some aspects may utilize the Internet of Things (IoT), where things (e.g., machines, devices, phones, sensors) can be connected to networks and the data from these things can be collected and processed within the things and/or external to the things. For example, with the IoT there can be sensors in many different devices, and high value analytics can be applied to identify hidden relationships and drive increased efficiencies. This can apply to both Big Data analytics and realtime (streaming) analytics.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a tablet, a mobile viewing device, a mobile audio player, a Global Positioning System (GPS) receiver, to name just a few. Computer readable media suitable for storing computer program instructions and data include all forms of nonvolatile memory, media and memory devices, including by way of semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

The methods, systems, devices, implementations, and embodiments discussed above are examples. Various configurations may omit, substitute, or add various procedures or components as appropriate. For instance, in alternative configurations, the methods may be performed in an order different from that described, or various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may use a combination of several other types of systems or servers, including those systems and servers mentioned herein.

Specific details are given in the description to provide a thorough understanding of examples of configurations (including implementations). However, configurations may be practiced without these specific details. For example, well-known circuits, processes, algorithms, structures, and techniques have been shown without unnecessary detail in order to avoid obscuring the configurations. This description provides examples of configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several examples of configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of operations may be undertaken before, during, or after the above elements are considered. Accordingly, the above description does not bound the scope of the claims.

The use of "capable of", "adapted to", or "configured to" herein is meant as open and inclusive language that does not foreclose devices adapted to or configured to perform additional tasks or operations. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations or additions to the present subject matter as may be readily apparent to one of ordinary skill in the art.

While this disclosure may contain many specifics, these should not be construed as limitations on the scope or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software or hardware product or packaged into multiple software or hardware products.

What is claimed is:

1. A computer-program product tangibly embodied in a non-transitory machine-readable storage medium, including instructions configured to cause a data processing apparatus to:

transmit, from a primary control node connected to one or more worker nodes on a communications grid, worker instructions related to a project being executed by the one or more worker nodes;

generate a snapshot of the communications grid, wherein the snapshot of the communications grid includes a project status of each of the one or more worker nodes, wherein a project status of a worker node includes a status of a portion of the project being executed by the worker node in the communications grid;

determine that a failed worker node of the one or more worker nodes has failed, wherein the one or more worker nodes has failed at a failure time;

identify a project status of the failed worker node using the snapshot of the communications grid, wherein the project status of the failed worker node includes a status of a portion of the project being executed by the failed worker node at the failure time; and transmit updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

2. The computer-program product of claim 1, further comprising instructions configured to cause the data processing apparatus to:

identify a functioning worker node of the one or more worker nodes to complete the portion of the project being executed by the failed worker node.

3. The computer-program product of claim 1, wherein each worker node on the communications grid is assigned a unique identifier, wherein the unique identifiers of the worker nodes indicate a hierarchy of the worker nodes associated with each unique identifier within the communications grid.

4. The computer-program product of claim 3, wherein the updated worker instructions facilitate a functioning worker node of the one or more worker nodes beginning execution of the portion of the project being executed by the failed worker node.

5. The computer-program product of claim 1, further comprising instructions configured to cause the data processing apparatus to:

determine that the failed worker node is the only worker node on the communications grid; and add a new worker node to the communications grid.

6. The computer-program product of claim 1, wherein the primary control node manages distribution of portions of the project that each worker node is responsible for executing.

7. The computer-program product of claim 1, wherein determining that a failed worker node of the one or more worker nodes has failed includes determining that the primary control node did not receive a heartbeat communication subsequent to transmitting the worker instructions related to the project being executed by the one or more worker nodes.

8. A computing device, comprising:

one or more processors; and a memory having instructions stored thereon, which when executed by the one or more processors, cause the computing device to perform operations including:

transmitting, from a primary control node connected to one or more worker nodes on a communications grid, worker instructions related to a project being executed by the one or more worker nodes;

generating a snapshot of the communications grid, wherein the snapshot of the communications grid includes a project status of each of the one or more worker nodes, wherein a project status of a worker node includes a status of a portion of the project being executed by the worker node in the communications grid;

determining that a failed worker node of the one or more worker nodes has failed, wherein the one or more worker nodes has failed at a failure time;

identifying a project status of the failed worker node using the snapshot of the communications grid, wherein the project status of the failed worker node includes a status of a portion of the project being executed by the failed worker node at the failure time; and transmitting updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

9. The computing device of claim 8, further comprising instructions, which when executed by the one or more processors, cause the computing device to perform operations including:

identifying a functioning worker node of the one or more worker nodes to complete the portion of the project being executed by the failed worker node.

10. The computing device of claim 8, wherein each worker node on the communications grid is assigned a unique identifier, wherein the unique identifiers of the worker nodes indicate a hierarchy of the worker nodes associated with each unique identifier within the communications grid.

11. The computing device of claim 10, wherein the updated worker instructions facilitate a functioning worker node of the one or more worker nodes beginning execution of the portion of the project being executed by the failed worker node.

12. The computing device of claim 8, further comprising instructions, which when executed by the one or more processors, cause the computing device to perform operations including:

determining that the failed worker node is the only worker node on the communications grid; and adding a new worker node to the communications grid.

13. The computing device of claim 8, wherein the primary control node manages distribution of portions of the project that each worker node is responsible for executing.

14. The computing device of claim 8, wherein determining that a failed worker node of the one or more worker nodes has failed includes determining that the primary control node did not receive a heartbeat communication subsequent to transmitting the worker instructions related to the project being executed by the one or more worker nodes.

15. A computer-implemented method, comprising:
transmitting, from a primary control node connected to one or more worker nodes on a communications grid, worker instructions related to a project being executed by the one or more worker nodes;
generating a snapshot of the communications grid, wherein the snapshot of the communications grid includes a project status of each of the one or more worker nodes, wherein a project status of a worker node includes a status of a portion of the project being executed by the worker node in the communications grid;
determining that a failed worker node of the one or more worker nodes has failed, wherein the one or more worker nodes has failed at a failure time;
identifying a project status of the failed worker node using the snapshot of the communications grid, wherein the project status of the failed worker node includes a status of a portion of the project being executed by the failed worker node at the failure time; and
transmitting updated worker instructions, wherein the updated worker instructions include the project status of the failed worker node and updated instructions related to the project being executed by the one or more worker nodes, wherein the updated worker instructions facilitate execution of the portion of the project being executed by the failed worker node.

16. The method of claim 15, further comprising:
identifying a functioning worker node of the one or more worker nodes to complete the portion of the project being executed by the failed worker node.

17. The method of claim 15, wherein each worker node on the communications grid is assigned a unique identifier, wherein the unique identifiers of the worker nodes indicate a hierarchy of the worker nodes associated with each unique identifier within the communications grid.

18. The method of claim 17, wherein the updated worker instructions facilitate a functioning worker node of the one or more worker nodes beginning execution of the portion of the project being executed by the failed worker node.

19. The method of claim 15, further comprising:
determining that the failed worker node is the only worker node on the communications grid; and
adding a new worker node to the communications grid.

20. The method of claim 15, wherein the primary control node manages distribution of portions of the project that each worker node is responsible for executing.

21. The method of claim 15, wherein determining that a failed worker node of the one or more worker nodes has failed includes determining that the primary control node did not receive a heartbeat communication subsequent to transmitting the worker instructions related to the project being executed by the one or more worker nodes.

* * * * *